US012785070B1

(12) United States Patent
Nam et al.

(10) Patent No.: US 12,785,070 B1
(45) Date of Patent: Nov. 3, 2026

(54) ELECTRODE, LITHIUM BATTERY COMPRISING SAME, AND METHOD FOR MANUFACTURING SAME

(71) Applicant: Samsung SDI Co., Ltd., Yongin-si (KR)

(72) Inventors: Hyun Nam, Yongin-si (KR); Ilkyong Kwon, Yongin-si (KR); Donggeun Lee, Yongin-si (KR); Jinhyon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 893 days.

(21) Appl. No.: 18/013,190

(22) PCT Filed: Jun. 7, 2022

(86) PCT No.: PCT/KR2022/008037

§ 371 (c)(1),
(2) Date: Jul. 3, 2023

(87) PCT Pub. No.: WO2022/260412

PCT Pub. Date: Dec. 15, 2022

(30) Foreign Application Priority Data

Jun. 10, 2021 (KR) ........................ 10-2021-0075631

(51) Int. Cl.
*H01M 4/1391* (2010.01)
*H01M 4/02* (2006.01)
(Continued)

(52) U.S. Cl.
CPC ....... *H01M 4/1391* (2013.01); *H01M 4/0404* (2013.01); *H01M 4/0411* (2013.01);
(Continued)

(58) Field of Classification Search
None
See application file for complete search history.

(56) References Cited

U.S. PATENT DOCUMENTS 5,552,239 A 9/1996 Gozdz et al.
10,038,193 B1 * 7/2018 Schroder ............. H01M 4/0416
(Continued)

FOREIGN PATENT DOCUMENTS

CN 103490041 A 1/2014
CN 103606686 A 2/2014
(Continued)

OTHER PUBLICATIONS

Machine Translation of CN-111180738 (Year: 2020).*
(Continued)

*Primary Examiner* — Gregg Cantelmo
(74) *Attorney, Agent, or Firm* — Womble Bond Dickinson (US) LLP

(57) ABSTRACT

Provided are an electrode, a lithium battery including the same, and a method of manufacturing the electrode. The electrode includes: an electrode active material layer including an electrode active material and a binder; and an electrode current collector disposed on a portion of one surface of the electrode active material layer or in a portion between opposite surfaces of the electrode active material layer; a first domain including the electrode active material layer and the electrode current collector disposed on one surface or between opposite surfaces of the electrode active material layer; and a second domain including the electrode active material layer, the electrode active material layer being free of an electrode current collector on one surface or between opposite surfaces thereof, wherein a mixture density of the electrode active material layer included in the second domain is less than 99% of a mixture density of the electrode active material layer included in the first domain.

20 Claims, 18 Drawing Sheets

(51) Int. Cl.

| | |
|---|---|
| ***H01M 4/04*** | (2006.01) |
| ***H01M 4/36*** | (2006.01) |
| ***H01M 4/62*** | (2006.01) |
| ***H01M 4/66*** | (2006.01) |
| ***H01M 10/0525*** | (2010.01) |

(52) U.S. Cl.
CPC ........... *H01M 4/623* (2013.01); *H01M 4/624* (2013.01); *H01M 4/661* (2013.01); *H01M 4/667* (2013.01); *H01M 10/0525* (2013.01); *H01M 2004/021* (2013.01); *H01M 4/366* (2013.01)

(56) References Cited

U.S. PATENT DOCUMENTS

| | | | | |
|---|---|---|---|---|
| 2002/0028380 | A1* | 3/2002 | Tanjo | H01M 10/0568 429/231.1 |
| 2011/0104542 | A1 | 5/2011 | Gan | |
| 2013/0224584 | A1 | 8/2013 | Sung et al. | |
| 2015/0207143 | A1 | 7/2015 | Wu et al. | |
| 2016/0006033 | A1 | 1/2016 | Sheem | |
| 2018/0212277 | A1 | 7/2018 | Park et al. | |
| 2019/0139714 | A1* | 5/2019 | Shin | H01M 4/139 |
| 2019/0237748 | A1 | 8/2019 | Shin et al. | |
| 2020/0373624 | A1 | 11/2020 | Choi et al. | |
| 2021/0098770 | A1 | 4/2021 | Yudi et al. | |
| 2022/0209220 | A1 | 6/2022 | Lee et al. | |
| 2023/0178734 | A1* | 6/2023 | Choi | H01M 10/0525 429/209 |

FOREIGN PATENT DOCUMENTS

| | | | | |
|---|---|---|---|---|
| CN | 104810524 | A | 7/2015 | |
| CN | 111180738 | A * | 5/2020 | H01M 50/54 |
| EP | 4024498 | A1 | 7/2022 | |
| JP | 2002-231211 | A | 8/2002 | |
| JP | 2008-10253 | A | 1/2008 | |
| JP | 2010-277740 | A | 12/2010 | |
| JP | 2012-178238 | A | 9/2012 | |
| KR | 10-2012-0124077 | A | 11/2012 | |
| KR | 10-2016-0005555 | A | 1/2016 | |
| KR | 10-2017-0099748 | A | 9/2017 | |
| KR | 20180042807 | A | 4/2018 | |
| KR | 10-2020-0090744 | A | 7/2020 | |
| KR | 10-2020-0134688 | A | 12/2020 | |
| KR | 10-2021-0006899 | A | 1/2021 | |

OTHER PUBLICATIONS

Extended European Search Report issued in corresponding EP Application No. 22820540.7, dated Oct. 15, 2025 (9 pages).
International Search Report dated Sep. 23, 2022, for International Application No. PCT/KR2022/008037 (2 pages).
China Office action dated May 8, 2026, issued in Chinese Patent Application No. 202280038159.5.
Korean Notice of Allowance dated Jan. 20, 2026, issued in Korean Patent Application No. 10-2021-0075631 (3 pages).

* cited by examiner

ELECTRODE, LITHIUM BATTERY COMPRISING SAME, AND METHOD FOR MANUFACTURING SAME

CROSS-REFERENCE TO RELATED APPLICATIONS

This application is a U.S. National Phase Patent Application of International Application Number PCT/KR2022/008037, filed on Jun. 7, 2022, which claims priority to Korean Patent Application Number 10-2021-0075631, filed on Jun. 10, 2021, the entire content of each of which is incorporated herein by reference.

TECHNICAL FIELD

The present disclosure relates to an electrode, a lithium battery using the same, and a method of manufacturing the same.

BACKGROUND ART

In order to obtain the miniaturization and high performance of various devices, the demand for high energy density as well as miniaturization and weight reduction of lithium batteries is increasing. That is, the importance of high-capacity lithium batteries is increasing.

In order to realize a lithium battery suitable for the above purpose, an electrode having high loading is being studied.

In electrodes with high loading, the distribution of components in the electrode is non-uniform and the density near the surface of an electrode is increased. Accordingly, the performance of a lithium battery employing such an electrode is degraded.

An electrode capable of preventing performance deterioration of a lithium battery is required.

DISCLOSURE

Technical Problem

An aspect provides an electrode in which an electrode current collector is disposed in a part of the electrode, and the density of the electrode active material layer mixture in a region where the electrode current collector is disposed is greater than the density of the electrode active material layer mixture in a region where the electrode collector is not disposed and thus, the decrease in performance of the electrode is prevented.

Another aspect provides a new electrode of which components have a uniform distribution and thus, the decrease in performance of the electrode is prevented.

Another aspect provides a lithium battery including the electrode.

Another aspect provides a method of manufacturing the electrode.

Technical Solution

According to an aspect, an electrode includes an electrode active material layer including an electrode active material and a binder, and an electrode current collector disposed on a portion of one surface of the electrode active material layer or in a portion between opposite surfaces of the electrode active material layer, wherein the electrode includes a first domain including the electrode active material layer and an electrode current collector disposed on one surface or between opposite surfaces of the electrode active material layer; and a second domain including the electrode active material layer, which is free of an electrode current collector on one surface or between opposite surfaces thereof, and a mixture density of the electrode active material layer included in the second domain is less than 99% of a mixture density of the electrode active material layer included in the first domain.

Another aspect provides a lithium battery including:

a positive electrode; a negative electrode; and an electrolyte disposed between the positive electrode and the negative electrode, and at least one of the positive electrode and the negative electrode is the electrode described above.

Another aspect provides a method of manufacturing an electrode, the method including:

preparing a mixture by dry-mixing an electrode active material, a dry conductive material, and a dry binder;

providing an electrode current collector; and disposing and pressing the mixture on one surface or opposite surfaces of the electrode current collector to manufacture an electrode including the electrode active material layer on one surface or opposite surfaces of the electrode current collector, wherein the electrode includes: a first domain including the electrode active material layer and the electrode current collector disposed on one surface or between opposite surfaces of the electrode active material layer; and a second domain including the electrode active material layer, which is free of the electrode current collector on one surface or between opposite surfaces thereof, and a mixture density of the electrode active material layer included in the second domain is less than 99% of a mixture density of the electrode active material layer included in the first domain.

Advantageous Effects

According to an aspect, since an electrode has a uniform distribution of components, the high-rate characteristic of a lithium battery using such an electrode is improved.

In addition, since an electrode current collector is disposed in a part of the electrode, and the mixture density of the electrode active material layer in a region where the electrode current collector is disposed is greater than that of the electrode active material layer in a region where the electrode current collector is not disposed, cycle characteristics of a lithium battery using the electrode can be improved.

Figure 1A:
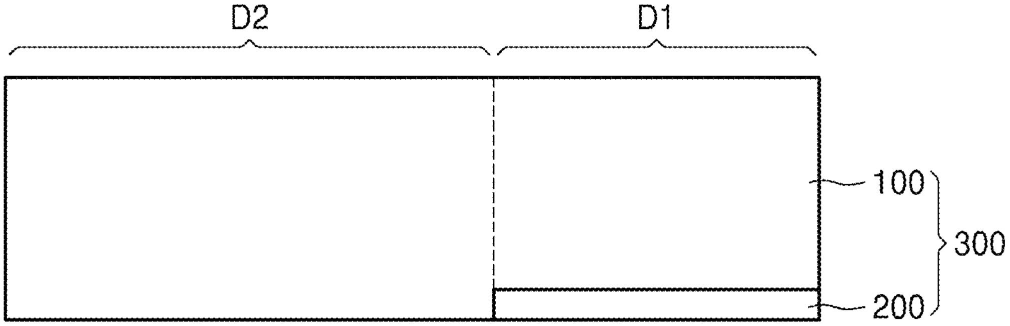
FIGS. 1A to 1B are cross-sectional views of an electrode according to an embodiment.

<Description of reference numerals for main parts of drawing>

| | |
|---|---|
| 1, 1000 Lithium batteries | 2 Positive electrode |
| 3 Negative electrode | 4 Separator |
| 5 Battery case | 6 Cap assembly |
| 100 Electrode active material layer | 200 Electrode current collector |
| 250 Coating layer | 300 Electrode |
| 300a Negative electrode | 300b Positive electrode |
| 400 Electrolyte | 500 Electrode assembly |

BEST MODE

Mode for Invention

The present inventive concept described hereinafter may be modified in various ways, and may have many examples, and thus, certain examples are illustrated in the drawings, and are described in detail in the specification. The present inventive concept may, however, should not be construed as limited to the example embodiments set forth herein, and rather, should be understood as covering all modifications, equivalents, or alternatives falling within the scope of the present inventive concept.

The terms used herein is for the purpose of describing particular embodiments only, and is not intended to be limiting the present inventive concept. An expression used in the singular encompasses the expression of the plural, unless it has a clearly different meaning in the context. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The sign "/" used herein may be interpreted as "and", or as "or" depending on the context.

In the drawings, thicknesses may be magnified or exaggerated to clearly illustrate various layers and regions. Like reference numbers may refer to like elements throughout the drawings and the following description. It will be understood that when one element, layer, film, section, sheet, etc. is referred to as being "on" another element, it can be directly on the other element or intervening elements may be present therebetween. Although the terms "first," "second," etc. may be used herein to describe various elements, these elements should not be limited by these terms. These terms are only used to distinguish one element from another element.

The term "dry" refers to a state as not being in intentional contact with a solvent, for example, a processing solvent, or a state as not intentionally including a solvent. For example, a dry conductive material refers to a conductive material that is not intentionally in contact with a solvent or a conductive material that does not intentionally contain a solvent. For example, a dry binder refers to a binder that is not intentionally in contact with a solvent or a binder that does not intentionally contain a solvent. For example, a binder that is not mixed with a solvent and is in a liquid state at room temperature, is a dry binder.

Hereinafter, an electrode according to embodiments, a lithium battery including the same, and a manufacturing method thereof will be described in more detail.

An electrode according to an embodiment includes: an electrode active material layer including an electrode active material and a binder; and an electrode current collector disposed on a portion of one surface of the electrode active material layer or in a portion between opposite surfaces of the electrode active material layer, the electrode includes a first domain including the electrode active material layer and the electrode current collector disposed on one surface or between opposite surfaces of the electrode active material layer; and a second domain which includes the electrode active material layer and does include the electrode current collector on one surface or between opposite surfaces of the electrode active material layer, and the mixture density of the electrode active material layer included in the second domain is less than 99% of the mixture density of the electrode active material layer included in the first domain. The mixture density of the electrode active material layer included in the second domain may be, for example, 98% or less, 97% or less, 96% or less, or 95% or less of the mixture density of the electrode active material layer included in the first domain. The mixture density of the electrode active material layer included in the second domain may be, for example, 50% to less than 99%, 60% to 98%, 70% to 97%, 80% to 96%, or 90% to 95% of the mixture density of the electrode active material layer included in the first domain.

Regarding the electrode, since the electrode current collector is disposed on the on a portion of one surface of the electrode active material layer or in a portion between opposite surfaces of the electrode active material layer, the volume occupied by the electrode current collector in the electrode may be reduced. Accordingly, the energy density of a lithium battery including an electrode having the electrode current collector having a reduced volume, is improved. Thus, a lithium battery providing high output may be provided.

In addition, regarding the electrode, since the first domain including an electrode current collector disposed on one surface or between opposite surfaces of the electrode active material layer has greater mixture density than the second domain that is free of the electrode current collector on one surface or between opposite surfaces of the electrode active material layer, the high-rate characteristics of a lithium battery including the electrode are further improved. For example, since the first domain containing the electrode current collector has a higher mixture density than the second domain that does not contain the electrode current collector, the porosity of the electrode active material layer included in the first domain is reduced and the area where the electrode active material contacts the electrode current collector is increased, resulting in a decrease in the internal resistance for electron transfer of the electrode in the first domain. Therefore, the decrease in high-rate characteristics due to current concentrated near a current collector included in the first domain during high-rate charging and discharging, may be effectively prevented. On the other hand, when the first domain containing the electrode current collector has a smaller mixture density than the second domain that does not contain the electrode current collector, the porosity of the electrode active material layer included in the first domain is increased and the area where the electrode active material contacts the electrode current collector is reduced, resulting in an increase in the internal resistance for electron transfer in the first domain of the electrode. Therefore, the decrease in high-rate characteristics due to current concentrated near a current collector included in the first domain during high-rate charging and discharging, may not be effectively prevented.

Regarding the electrode, the difference between the mixture density of the electrode active material layer included in the first domain and the mixture density of the electrode active material layer included in the second domain may be 0.1 g/cm$^3$ to 2.0 g/cm$^3$, 0.5 g/cm$^3$ to 2.0 g/cm$^3$, or 1 g/cm$^3$ to 2.0 g/cm$^3$. The difference between the mixture density of the electrode active material layer included in the first domain and the mixture density of the electrode active material layer included in the second domain may be 0.1 to 0.5 g/cm$^3$, 0.5 to 1 g/cm$^3$, or 1 to 2 g/cm$^3$ Within these ranges of difference between the mixture density of the electrode active material layer included in the first domain and the mixture density of the electrode active material layer included in the second domain, the high-rate characteristics of a lithium battery including an electrode may be more effectively improved.

The mixture density of the electrode active material layer included in the first domain may be, for example, 1 g/cm$^3$ to 5 g/cm$^3$.

The mixture density of the electrode active material layer included in the second domain may be, for example, 1 g/cm$^3$ to 5 g/cm$^3$.

Regarding the electrode, the porosity of the electrode active material layer included in the first domain may be 99% or less, 98% or less, 97% or less, 96% or less, or 95% or less of the porosity of the electrode active material layer included in the second domain. The porosity of the electrode active material layer included in the first domain may be, for example, 40% to 99%, 60% to 98%, 70% to 97%, 80% to 96%, or 90% to 95% of the porosity of the electrode active material layer included in the second domain. When the electrode active material layer included in the first domain has these ranges of porosity, further improved high-rate characteristics may be obtained When the electrode active material layer included in the second domain has these ranges of thickness, the porosity of the electrode active material layer included in the second domain is increased compared to the porosity of the electrode active material layer included in the first domain. Therefore, the electrolyte-solution wetting ability of the electrode active material layer included in the second domain is improved. As a result, when the electrode active material layer included in the second domain is wet with the electrolyte solution, the ionic conductivity of the electrode active material layer included in the second domain may be increased. For example, the second domain having a high porosity may act as an ion conduction channel, and the first domain having a low porosity may act as an electron conduction channel.

Regarding the electrode, the thickness of the electrode active material layer included in the second domain may be 99% or less, 98% or less, 97% or less, 96% or less, or 95% or less of the total thickness of the electrode active material layer and the electrode current collector included in the first domain. The thickness of the electrode active material layer included in the second domain may be, for example, 50% to 99%, 56 to 98%, 60% to 97%, 65% to 96%, or 70% to 95% of the total thickness of the electrode active material layer and the electrode current collector included in the second domain. When the electrode active material layer included in the second domain has these ranges of thicknesses, further increased energy density may be provided due to the decrease in volume. For example, the energy density per unit volume of an electrode structure obtained by alternately stacking a plurality of electrodes, each including the second domain having a reduced thickness, in such a manner that the electrodes are arranged in opposite directions, may be increased compared to that of an electrode structure obtained by stacking a plurality of electrodes of the related art having a uniform thickness.

Regarding the electrode, the first domain and the second domain may have different thicknesses, and may include a surface step of an electrode active material layer disposed at the boundary between the first domain and the second domain. The first domain may be thicker than the second domain as much as the surface step. The height of the surface step of the electrode active material layer may be, for example, 1% or more, 2% or more, 3% or more, 4% or more, or 5% or more of the total thickness of the electrode active material layer and the electrode current collector included in the first domain. The height of the surface step of the electrode active material layer may be, for example, 1% to 20%, 2% to 20%, 3% to 20%, 4% to 20% or 5% to 20% of the total thickness of the electrode active material layer and the electrode current collector included in the first domain. When the surface step of the electrode active material layer has these ranges of heights, further improved energy density can be provided due to the decrease in the thickness of the electrode active material layer included in the second domain. For example, the energy density per unit volume of an electrode structure obtained by alternately stacking a plurality of electrodes each having a surface step between the first domain and the second domain having a smaller thickness than the first domain, may be increased compared to that of an electrode structure obtained by stacking a plurality of electrodes of the related art having a uniform thickness.

The binder included in the electrode active material layer may be, for example, a dry binder. A dry binder may be, for example, a binder that is not wet, dissolved, or dispersed in a solvent. A dry binder is, for example, a binder that does not contain or is not in contact with a solvent.

A dry binder may be, for example, a fibrillized binder. The fibrillized binder can act as a matrix that supports and binds the electrode active material and other components included in the electrode active material layer. It is confirmed from a scanning electron microscope image of a cross section of an electrode that the fibrillized binder has a fibrous form. The fibrillized binder may have an aspect ratio of, for example, 10 or more, 20 or more, 50 or more, or 100 or more.

The dry binder may be, for example, polytetrafluoroethylene (PTFE), a polyvinylidene fluoride-hexapropylene (PVDF-HFP) copolymer, polyvinylidene fluoride (PVDF), polyvinyl alcohol, polyacrylonitrile, carboxymethylcellulose (CMC), starch, hydroxypropylcellulose, cellulose, polyvinylpyrrolidone, polyethylene, polypropylene, ethylene-propylene-diene polymer (EPDM), sulfonated-EPDM, styrene butadiene rubber (SBR), fluoro rubber, or a copolymer thereof, and is not limited thereto. The dry binder may be any binder that is used in the manufacture of a dry electrode. Dry binders may include a fluorine-based binder. The fluorine-based binder may be, for example, polytetrafluoroethylene (PTFE), polyvinylidene fluoride-hexapropylene (PVDF-HFP) copolymer, or polyvinylidene fluoride (PVDF).

The amount of the dry binder included in the electrode active material layer may be, for example, 1 wt % to 10 wt %, or 1 wt % to 5 wt %, based on the total weight of the electrode active material layer. When the amount of the dry binder has these ranges of amounts, the binding force of the electrode is improved and the high energy density of the electrode may be maintained.

The electrode active material layer may further include, for example, a conductive material. The conductive material may be, for example, a dry conductive material. A dry conductive material may be, for example, a conductive material that is not wet, dissolved, or dispersed in a solvent. A dry conductive material may be, for example, a conductive material that does not contain or is not in contact with a solvent. The dry conductive material may include, for example, a carbon-based conductive material. The carbon-based conductive material may be carbon black, graphite particle, natural graphite, artificial graphite, acetylene black, ketjen black, carbon fiber, carbon nanotubes, and is not limited thereto. The carbon-based conductive material may be any carbon-based conductive material that is used in the art.

The amount of the dry conductive material included in the electrode active material layer may be, for example, 1 wt % to 10 wt %, or 1 wt % to 5 wt %, based on the total weight of the electrode active material layer. When the amount of the dry conductive material has these ranges of amounts, the conductivity of the electrode is improved and the high energy density of the electrode may be maintained.

The electrode active material layer may be, for example, a self-standing film. In an embodiment, the electrode active material layer may maintain the form of a film without a support. Therefore, the electrode active material layer may be prepared as a separate self-standing film and then placed on the electrode current collector. The electrode active material layer is manufactured in a dry process. Accordingly, the electrode active material layer may not include a process solvent which is intentionally added. For example, a residual processing solvent may not be included. Although a small amount of unintended solvent may remain in the electrode active material layer, the solvent is not an intentionally added processing solvent. Therefore, the electrode active material layer is distinguished from a wet electrode active material layer prepared by mixing components and a processing solvent and then removing part or all of the processing solvent by drying.

The electrode current collector may additionally include a coating layer disposed on one surface or opposite surfaces of the electrode current collector.

A material that constitutes the electrode current collector may be any material that does not react with lithium, that is, does not form an alloy or compound with lithium and has conductivity. A metal substrate may be, for example, a metal or an alloy. The metal substrate may be, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or alloys thereof.

The electrode current collector may have a shape selected from, for example, a sheet, a foil, a film, a plate, a porous material, a mesoporous material, a through hole-containing material, a polygonal ring, a mesh, a foam, and a nonwoven fabric. The shape, however, is not limited thereto, and may be any shape that is used in the art.

In an embodiment, a coating layer may be placed directly on one surface or opposite surfaces of the electrode current collector. Therefore, another layer may not be disposed between the electrode current collector and the coating layer. When the coating layer is disposed directly on one surface or opposite surfaces of the electrode current collector, the binding force between the electrode current collector and the electrode active material layer may be further increased.

The thickness of the coating layer may be, for example, 30% or less of the thickness of an electrode current collector. In an embodiment, the thickness of the coating layer may be 0.01% to 30%, 0.1% to 30%, 0.5 to 30%, 1% to 25%, 1% to 20%, 1% to 15%, 1% to 10%, 1% to 5%, or 1% to 3% of the thickness of the electrode current collector. The thickness of the coating layer may be, for example, 10 nm to 5 μm, 50 nm to 5 μm, 200 nm to 4 μm, 500 nm to 3 μm, 500 nm to 2 μm, 500 nm to 1.5 μm, 700 nm to 1.3 μm. When the coating layer has these ranges of a thickness, the binding force between the electrode current collector and the electrode active material layer is further improved, and an increase in interfacial resistance can be suppressed.

The coating layer may include, for example, a binder. When the coating layer includes the binder, the binding force between the electrode current collector and the electrode active material layer may be further increased. The binder included in the coating layer may be, for example, a conductive binder or a non-conductive binder.

The conductive binder may be, for example, an ionically conductive binder, and/or an electronically conductive binder. The binders that have both ionic and electronic conductivity belong to both an ionically conductive binder and an electronically conductive binder.

The ionically conductive binder may be, for example, polystyrene sulfonate (PSS), polyvinylidene fluoride-hexafluoropropylene copolymer (PVDF-HFP), polyvinyl fluoride (PVF), polyvinyl polyvinylidene fluoride (PVDF), poly(methylmethacrylate) (PMMA), polyethylene oxide (PEO), polyethylene glycol (PEG), polyacrylonitrile (PAN), polytetrafluoroethylene (PTFE), polyethylenedioxythiophene (PEDOT), polypyrrole (PPY), polyacrylonitrile (PAN), polyaniline, or polyacetylene. An ionically conductive binder may contain a polar functional group. An ionically conductive binder containing a polar functional group is, for example, Nafion, Aquivion, Flemion, Gore, Aciplex, Morgane ADP, sulfonated poly(ether ether ketone) (SPEEK), sulfonated poly(arylene ether ketone ketone sulfone) (SPAEKKS), sulfonated poly(aryl ether ketone), (SPAEK), poly [bis(benzimidazobenzisoquinolinones)] (SPBIBI), poly(styrene sulfonate) (PSS), lithium 9,10-diphenylanthracene-2-sulfonate, (DPASLi*), etc. An electronically conductive binder may be, for example, polyacetylene, polythiophene, polypyrrole, poly(p-phenylene), poly(phenylenevinylene), poly(phenylenesulfide), and polyaniline. The coating layer may be, for example, a conductive layer including a conductive polymer.

In an embodiment, a binder included in the coating layer may be selected from binders included in the electrode active material layer. The coating layer may contain the same binder as used in the electrode active material layer. The binder included in the coating layer may be, for example, a fluorine-based binder. The fluorine-based binder included in the coating layer may be, for example, polyvinylidene fluoride (PVDF). In an embodiment, the coating layer may be disposed on the current collector in a dry or wet manner. The coating layer may be a binding layer including, for example, a binder.

The coating layer may include, for example, a carbon-based conductive material. The carbon-based conductive material included in the coating layer may be selected from carbon-based conductive materials included in the electrode active material layer. The coating layer may include the same carbon-based conductive material as used in the electrode active material layer. When the coating layer includes a carbon-based conductive material, the coating layer may be, for example, a conductive layer. The coating layer may be, for example, a conductive layer including a binder and a carbon-based conductive material.

The coating layer may be disposed on the electrode current collector in a dry manner by deposition such as CVD or PVD. The coating layer may be placed on the electrode current collector in a wet manner by, for example, spin coating or dip coating. In an embodiment, a coating layer may be disposed on the electrode current collector by depositing a carbon-based conductive material on the electrode current collector. The dry-coated coating layer consists of a carbon-based conductive material and may not contain a binder. In an embodiment, a coating layer may be disposed on the electrode current collector by coating and drying a composition including a carbon-based conductive material, a binder and a solvent on the surface of the electrode current collector. The coating layer may have a single-layer structure or a multi-layer structure including a plurality of layers.

The thickness of the electrode current collector according to the present disclosure may be smaller than that of an electrode current collector included in an electrode of the related art. Therefore, due to the inclusion of a thin film current collector, an electrode according to an embodiment is distinguished from an electrode of the related art including a thick film current collector. Since an electrode according to an embodiment includes a thin film current collector, the thickness of the electrode active material layer in the electrode is relatively increased. As a result, the energy density of a lithium battery including these electrodes is increased. The thickness of an electrode current collector including a metal substrate and a coating layer may be, for example, less than 15 μm, less than 14.5 μm, or less than 14 μm. The thickness of the electrode current collector may be, for example, 0.1 μm to less than 15 μm, 1 μm to 14.5 μm, 2 μm to 14 μm, 3 μm to 14 μm, 5 μm to 14 μm, or 10 μm to 14 μm.

Regarding the electrode, when the electrode active material layer included in the first domain is measured using a surface and interfacial measuring analysis system (SAICAS), with respect to the entire thickness of the electrode active material layer, the ratio of change in a vertical relative force ($F_{VR}$) according to the depth from a first point spaced 5% from the surface of the electrode active material layer in a direction from the surface of the electrode active material layer to the electrode current collector to a second point spaced 5% apart from the surface of the electrode current collector in a direction from the surface of the electrode current collector to the electrode active material layer may be 300% or less. The change rate of the vertical relative force may be, for example, 10% to 300%, 10% to 250%, 10% to 200%, 10% to 150%, or 10% to 100%. The second point spaced 5% apart from the surface of the electrode current collector in the direction from the surface of the electrode current collector to the electrode active material layer, may be, for example, a point spaced 95% from the surface of the electrode active material layer in the direction from the surface of the electrode active material layer to the electrode current collector, with respect to the entire thickness of the electrode active material layer. The vertical relative force may be calculated from Equation 1. Evaluation Example 1 may be referred to, for the SAICAS measurement method.

$$\text{Rate of change in vertical relative force } (F_V) = [(\text{maximum value of vertical relative force } (F_{VR1}) - \text{minimum value of vertical relative force } (F_{VR1}))/\text{minimum value of vertical relative force } (F_{VR1})] \times 100 \quad \text{Equation 1}$$

Since the change rate of the vertical relative force is 300% or less when the electrode is measured using the surface and interfacial measuring analysis system (SAICAS), the uniformity of the distribution of components within the electrode may be improved. In addition, since a side reaction and an increase in internal resistance due to non-uniform distribution of components in the electrode active material layer are suppressed, the reversibility of the electrode reaction may be improved. Even in the case of an electrode having a high loading, the cyclic characteristics of a lithium battery may be improved. In addition, when the electrode includes an interlayer, the binding force of the electrode active material layer and the electrode current collector is further improved, and the internal resistance of the electrode is reduced. Accordingly, the cyclic characteristics of a lithium battery including such an electrode may be improved.

Regarding the electrode active material layer included in the first domain in the electrode, during SAICAS measurement, with respect to the total depth from the surface of the electrode active material layer to the surface of the electrode current collector, the horizontal force ratio of a second horizontal binding force ($F_{H2}$) at a second point spaced by 10% in the direction from the surface of the electrode current collector to the electrode active material layer to a first horizontal binding force ($F_{H1}$) at a first point spaced by 10% in the direction (for example, the depth direction) from the surface of the electrode active material layer to the electrode current collector may be 50% or more. The horizontal force ratio may be, for example, about 50% to about 100%, about 60% to about 100%, about 70% to about 100%, about 80% to about 100%, or about 90% to about 100%. The second point spaced 10% apart from the surface of the electrode current collector in the direction from the surface of the electrode current collector to the electrode active material layer, may be, for example, a point spaced 90% from the surface of the electrode active material layer in the direction from the surface of the electrode active material layer to the electrode current collector, with respect to the entire thickness of the electrode active material layer. The horizontal force ratio is expressed as Equation 2, for example. Evaluation Example 2 may be referred to, for the SAICAS measurement method.

$$\text{Horizontal force ratio} = [\text{second horizontal force } (F_{H2})/\text{first horizontal force } (F_{H1})] \times 100 \quad \text{<Equation 2>}$$

Since the horizontal force ratio is 50% or more during SAICAS measurement, the uniformity of the distribution of components in the electrode may be further improved. Since the electrode has these ranges of horizontal force, the cyclic characteristics of a lithium battery including the electrode are further improved.

The electrode described above may be, for example, a positive electrode. The positive electrode may include a positive electrode active material layer, and the positive electrode active material layer may include a positive electrode active material.

As a positive electrode active material included in the positive electrode active material, any lithium metal oxide may be used without limitation as long as it is used in the art.

The positive electrode active material may be, for example, one or more types of a complex oxide of lithium and a metal selected from cobalt, manganese, nickel, and combinations thereof. The positive electrode active material may be, for example, a compound represented by one of the following formulae: $Li_aA_{1-b}B_bD_2$ (where 0.90≤a≤1, and 0≤b≤0.5); $Li_aE_{1-b}B_bO_{2-c}D_c$ (where 0.90≤a≤1, 0≤b≤0.5, and 0≤c≤0.05); $LiE_{2-b}B_bO_{4-c}D_c$ (where 0≤b≤0.5, and 0≤c≤0.05); $Li_aNi_{1-b-c}CO_bB_cD_a$ (where 0.90≤a≤1, 0≤b≤0.5, 0≤c≤0.05, and 0<α≤2); $Li_aNi_{1-b-c}CO_b\ B_cO_{2-\alpha}F_\alpha$ (where 0.90≤a≤1, 0 ≤b≤0.5, 0≤c≤0.05, and 0<α<2); $Li_aNi_{1-b-c}CO_bB_cO_{2-\alpha}F_2$ (where 0.90≤a≤1, 0≤b≤0.5, 0≤c≤0.05, and 0<a<2); $Li_aNi_{1-b-c}Mn_bB_cD_a$ (where 0.90≤a≤1, 0≤b≤0.5, 0 ≤c≤0.05, and 0<a≤2); $Li_aNi_{1-b-c}Mn_bB_cO_{2-\alpha}F_\alpha$ (where 0.90≤a≤1, 0≤b≤0.5, 0≤c<0.05, and 0<<<2); $Li_aNi_{1-b-c}Mn_bB_cO_{2-\alpha}F_2$ (where 0.90≤a≤1, 0≤b><0.5, 0<<<0.05, and 0<a<2); $Li_aNi_bE_cG_dO_2$ (where 0.90≤a≤1, 0≤b≤0.9, 0≤c≤0.5, and 0.001≤d≤0.1.); $Li_aNi_bCo_cMn_dGeO_2$ (where 0.90≤a≤1, 0≤b≤0.9, 0≤c≤0.5, 0≤d≤0.5, and 0.001≤e≤0.1); $Li_aNiG_bO_2$ (where 0.90≤a≤1 and 0.001≤b≤0.1); $Li_aCoG_bO_2$ (where 0.90≤a≤1 and 0.001≤b≤0.1); $Li_aMnG_bO_2$ (where 0.90≤a≤1 and 0.001≤b≤0.1); $Li_aMn_2G_bO_4$ (where 0.90≤a≤1 and 0.001≤b≤0.1); $QO_2$; $QS_2$; $LiQS_2$; $V_2O_5$; $LiV_2O_5$; $LiIO_2$; $LiNiVO_4$; $Li_{(3-1)}J_2(PO_4)_3$(0≤f≤2); $Li_{(3-f)}Fe_2(PO_4)_3$(0≤f≤2); and $LiFePO_4$.

In the Formulae representing these compounds, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

A compound in which a coating layer is provided on the surface of these compound may be used, and a mixture of these compound and the compound provided with the coating layer may also be used. The coating layer provided on the surface of these compound may include a coating element compound such as oxide of a coating element, hydroxide of a coating element, oxyhydroxide of a coating element, oxycarbonate of a coating element, or hydroxycarbonate of a coating element. The compound constituting the coating layer may be amorphous or crystalline. The coating element included in the coating layer may be Mg, Al, Co, K, Na, Ca, Si, Ti, V, Sn, Ge, Ga, B, As, Zr, or a mixture thereof. A method of forming the coating layer may be selected within a range that does not adversely affect the physical properties of the positive electrode active material. The coating method may be, for example, spray coating, dipping method, or the like. A detailed description of the coating method will be omitted because it may be well understood by those in the art.

The amount of the positive electrode active material included in the positive electrode active material layer may be, for example, about 80 wt % to about 98 wt %, or about 90 wt % to about 98 wt %, based on the total weight of the positive electrode active material layer.

The positive electrode active material may be, for example, a composite positive electrode active material.

A composite positive electrode active material may include, for example, a core including lithium transition metal oxide and a shell located on and conformed to the core, wherein the shell includes at least one type of a first metal oxide represented by the formula $M_aO_b$(0<a≤3, 0≤b<4, and when a is 1, 2, or 3, b is not an integer) and graphene, wherein the first metal oxide is located inside the matrix of graphene, and M is at least one metal selected from Groups 2 to 13, Group 15, and Group 16 of the Periodic Table of Elements, the lithium transition metal oxide includes nickel, and the amount of nickel is 80 mol % or more based on the total number of moles of the transition metal. A shell including a first metal oxide and graphene is disposed on the core of the composite positive electrode active material.

Uniform coating may not be formed on the core by using graphene of the related art due to agglomeration. In contrast, in the case of the composite positive electrode active material, due to the use of a composite including a plurality of first metal oxides disposed on a graphene matrix, a uniform shell is disposed on the core while preventing aggregation of graphene. Therefore, by effectively blocking the contact between the core and the electrolyte solution, side reactions caused by the contact between the core and the electrolyte are prevented. Further, reduction ($Ni^{3+}$→$Ni^{2+}$) of nickel ions due to the electrolyte and the mixing of cations due to the electrolyte are suppressed, thereby preventing the formation of a resistance layer such as a NiO phase. Also, elution of nickel ions is suppressed. Since the shell containing graphene has flexibility, generation of cracks inside the composite positive electrode active material is suppressed by easily tolerating volume changes of the composite positive electrode active material during charging and discharging. Since graphene has high electronic conductivity, interface resistance between the composite positive electrode active material and the electrolyte is reduced. Accordingly, the internal resistance of the lithium battery is maintained or reduced despite the introduction of a graphene-including shell. In addition, since the first metal oxide has the voltage resistance, deterioration of the lithium transition metal oxide included in the core can be prevented during charging and discharging at a high voltage. As a result, the cyclic characteristics and high-temperature stability of a lithium battery including a composite positive electrode active material are improved. The shell may include, for example, one type of first metal oxide or two or more types of different first metal oxides. In addition, in the composite positive electrode active material, a lithium transition metal oxide has a high nickel amount of 80 mol % or more with respect to the total number of moles of transition metal, and high discharge capacity and cycle time which are simultaneously obtained by disposing a shell containing first metal oxide and graphene on the core. Therefore, the composite positive electrode active material having a high nickel amount of 80 mol % or more can provide increased capacity compared to a composite positive electrode active material having a relatively low nickel content, while still providing excellent lifespan characteristics. Metal included in the first metal oxide may be at least one selected from Al, Nb, Mg, Sc, Ti, Zr, V, W, Mn, Fe, Co, Pd, Cu, Ag, Zn, Sb, and Se.

The first metal oxide may be, for example, at least one selected from $Al_2O_z$(0<Z<3), $NbO_x$(0<x<2.5), $MgO_x$ (0<x<1), $Sc_2O_z$(0<<<3), $TiO_y$(0<y<2), $ZrO_y$(0<y<2), $V_2O_z$ (0<z<3), $WO_y$(0<y<2), $MnO_y$(0<y<2), $Fe_2O_z$(0<Z<3), $Co_3O_w$(0<w<4), $PdO_x$(0<x<1), $CuO_x$(0<x<1), $AgO_x$ (0<x<1), $ZnO_x$(0<x<1), $Sb_2O_z$(0<Z<3), and $SeO_y$(0<y<2) Since the first metal oxide is placed in the graphene matrix, uniformity of the shell placed on the core is improved, and voltage resistance of the composite positive electrode active material may be further improved. For example, the shell includes $Al_2O_x$(0<x<3) as the first metal oxide. The shell may further include at least one type of a second metal oxide represented by $M_aO_c$ (0<a≤3, 0≤c≤4, and when a is 1, 2, or 3, c is an integer). M is at least one metal selected from Groups 2 to 13, Group 15, and Group 16 of the Periodic Table of Elements. For example, the second metal oxide includes the same metal as the first metal oxide, and the ratio c/a of c to a in the second metal oxide may be greater than the ratio b/a of b to a in the first metal oxide. For example, c/a>b/a. The second metal oxide may be selected from $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and $SeO_2$. The first metal oxide may be the reduction product of the second metal oxide. The first metal oxide is obtained by reducing some or all of the second metal oxide. Accordingly, the first metal oxide has a lower oxygen amount and a greater metal oxidation number than the second metal oxide. For example, the shell includes $Al_2O_x$ (0<x<3) as the first metal oxide and $Al_2O_3$ as the second metal oxide. In the composite positive electrode active material, for example, the graphene included in the shell is chemically bound to the transition metal of the lithium transition metal oxide included in the core through chemical bonding. The carbon atom (C) of the graphene included in the shell and the transition metal (Me) of the lithium transition metal oxide are chemically bound through a CO-Me bond (for example, a CO—Ni bond) via an oxygen atom. When the graphene included in the shell is chemically bound to the lithium transition metal oxide included in the core through chemical bonding, the core and the shell are composited. Therefore, this is distinguished from a simple physical mixture of graphene and lithium transition metal oxide. In addition, the first metal oxide and graphene included in the shell are also chemically bound to each other through chemical bonding. Here, the chemical bond is, for example, a covalent bond or an ionic bond. The covalent bond may be, for example, a bond including at least one of an ester group, an ether group, a carbonyl group, an amide group, a carbonate anhydride group, and an acid anhydride group. The ionic bond may be, for example, a bond including a carboxylic acid ion, an ammonium ion, or an acyl cation group. The thickness of the shell may be, for example, 1 nm to 5 μm, 1 nm to 1 μm, 1 nm to 500 nm, 1 nm to 200 nm, 1 nm to 100 nm, 1 nm to 90 nm, 1 nm to 80 nm, 1 nm to 70 nm, 1 nm to 60 nm, 1 nm to 50 nm, 1 nm to 40 nm, 1 nm to 30 nm, 1 nm to 20 nm, or 1 nm to 10 nm. When the shell has these thickness ranges, an increase in internal resistance of the lithium battery including the composite positive electrode active material is suppressed.

The amount of the composite included in the composite positive electrode active material may be 3 wt % or less, 2 wt % or less, 1 wt % or less, 0.5 wt % or less, or 0.2 wt % or less, based on the total weight of the composite positive electrode active material. The amount of the composite may be about 0.01 wt % to about 3 wt %, about 0.01 wt % to about 1 wt %, about 0.01 wt % to about 0.7 wt %, about 0.01 wt % to about 0.6 wt %, about 0.1 wt % to about 0.5 wt %, about 0.01 wt % to about 0.2 wt %, about 0.01 wt % to about 0.1 wt %, or about 0.03 wt % to about 0.07 wt %, based on the total weight of the composite positive electrode active material. When the composite positive electrode active material includes these ranges of composite, the cycle characteristics of the lithium battery including the composite positive electrode active material are further improved. The particle diameter of at least one selected from the first metal oxide and the second metal oxide included in the composite may be 1 nm to 1 μm, 1 nm to 500 nm, 1 nm to 200 nm, 1 nm to 100 nm, 1 nm to 70 nm, 1 nm to 50 nm, 1 nm to 30 nm, 3 nm to 30 nm, 3 nm to 25 nm, 5 nm to 25 nm, 5 nm to 20 nm, or 7 nm to 20 nm. Within these nanometer ranges of a particle diameter, the first metal oxide and/or the second metal oxide may be more uniformly distributed in the matrix of graphene of the composite. Therefore, this composite can be uniformly coated on the core without agglomeration to form a shell. Further, the first metal oxide and/or the second metal oxide may be more evenly located on the core because the first metal oxide and/or the second metal oxide has a particle diameter within this nanometer range. Therefore, the first metal oxide and/or the second metal oxide may be uniformly located on the core, thereby more effectively exhibiting voltage resistance characteristics. The average particle diameters of the first metal oxide and the second metal oxide may be measured by using, for example, a laser diffraction method or a measuring device using a dynamic light scattering method. The average particle size is measured by using, for example, a laser scattering particle size distribution system (for example, LA-920 manufactured by HORIBA), and is a median particle size (D50) at a cumulative volume of 50% counted from the side of a particle with a smaller particle size by volume conversion.

The core included in the composite positive electrode active material may include lithium transition metal oxide represented by Formula 1:

$$Li_aNi_xCo_yM_zO_{2-b}A_b \qquad \text{Formula 1}$$

In Formula 1, 1.0≤a≤1.2, 0≤b≤0.2, 0.8≤x<1, 0<y≤0.3, 0<z≤0.3, and x+y+z=1, M is at least one selected from manganese (Mn), niobium (Nb), vanadium (V), magnesium (Mg), gallium (Ga), silicon (Si), tungsten (W), molybdenum (Mo), iron (Fe), chromium (Cr)), copper (Cu), zinc (Zn), titanium (Ti), aluminum (Al), and boron (B), and A is F, S, CI, Br, or a combination thereof.

The core included in the composite positive electrode active material may include lithium transition metal oxide represented by Formulae 2 to 4:

$$LiNi_xCo_yMn_zO_2, \qquad \text{Formula 2}$$

$$LiNi_xCo_yAl_zO_2, \qquad \text{Formula 3}$$

wherein $0.8 \le x \le 0.95$, $0 < y \le 0.2$, $0 < z \le 0.2$, and $x + y + z = 1$, and $$LiNi_xCo_yAl_vMn_wO_2 \qquad \text{Formula 4}$$

wherein $0.8 \le x \le 0.95$, $0 < y \le 0.2$, $$0 < v \le 0.2,\ 0 < w \le 0.2, \text{ and } x + y + v + w = 1.$$

The electrode may be, for example, a negative electrode. The negative electrode may include a negative electrode active material layer, and the negative electrode active material layer may include a negative electrode active material.

The negative electrode active material may be any negative electrode active material that is used as a negative electrode active material for a lithium battery in the art. For example, at least one selected from the group consisting of lithium metal, a metal alloyable with lithium, a transition metal oxide, a non-transition metal oxide, and a carbon-based material, may be included. Examples of the lithium-alloyable metal include Si, Sn, Al, Ge, Pb, Bi, Sb, an Si—Y alloy (Y is an alkali metal, an alkali-earth metal, a Group 13 element, a Group 14 element, a transition metal, a rare earth element, or a combination thereof, not Si), and an Sn—Y alloy (Y is an alkali metal, an alkali-earth metal, a Group 13 element, a Group 14 element, a transition metal, a rare earth element, or a combination thereof, not Sn). The element Y may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. The transition metal oxide may be, for example, lithium titanium oxide, vanadium oxide, lithium vanadium oxide or the like. Non-transition metal oxides may be, for example, $SnO_2$, $SiO_x(0<x<2)$, or the like. The carbon-based material may be, for example, crystalline carbon, amorphous carbon, or a mixture thereof. Crystalline carbon may be, for example, graphite, such as natural or artificial graphite in an amorphous form, a platy form, a flake form, a spherical form, or a fibrous form. Amorphous carbon may be, for example, soft carbon (low-temperature calcined carbon) or hard carbon, mesophase pitch carbide, calcined coke, and the like.

The amount of the negative electrode active material included in the negative electrode active material layer may be, for example, about 80 wt % to about 98 wt %, or about 90 wt % to about 98 wt %, based on the total weight of the negative electrode active material layer.

Referring to FIG. 1A, in an embodiment, an electrode 300 includes an electrode active material layer 100 including an electrode active material and a binder, and an electrode current collector 200 disposed on a portion of one surface of the electrode active material layer 100.

A first domain D1 is a region including the electrode active material layer 100 and the electrode current collector 200 disposed on one surface of the electrode active material layer 100. That is, the first domain D1 is a region including the electrode current collector 200 and the electrode active material layer 100 disposed on one surface of the electrode current collector 200 in the thickness direction of the electrode. A second domain D2 is a region which includes the electrode active material layer 100 and does not include the electrode current collector 200 disposed on one surface of the electrode active material layer 100. That is, the second domain D2 is the remaining region of the electrode active material layer except for the first domain D1. In FIG. 1A, the first domain D1 and the second domain D2 may be distinguished from each other by, for example, a virtual dotted line disposed along the thickness direction of the electrode. The mixture density of the electrode active material layer 100 included in the second domain D2 may be less than 99%, 98% or less, 97% or less, 96% or less, 95% or less, or 90% or less, of the mixture density of the electrode active material layer 100 included in the first domain D1. For example, the mixture density of the electrode active material layer 100 included in the second domain D2 may be about 50% to about 99%, about 60% to about 98%, about 70% to about 97%, about 80% to about 96%, or about 90% to about 95%, of the mixture density of the electrode active material layer 100 included in the first domain D1.

Figure 1B:
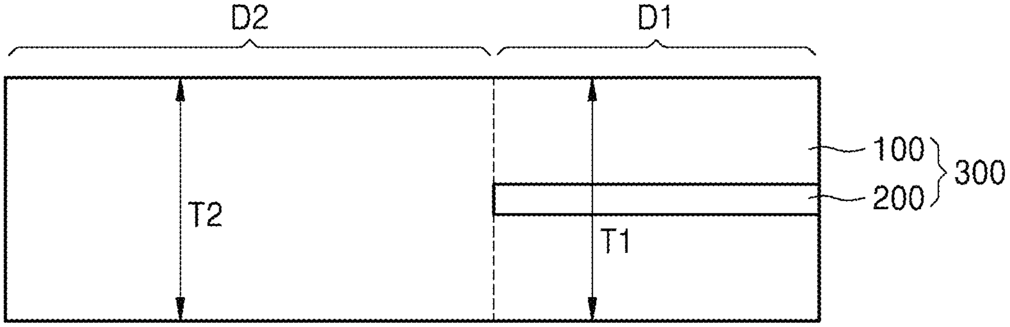

Referring to FIG. 1B, in an embodiment, an electrode 300 includes an electrode active material layer 100 including an electrode active material and a binder, and an electrode current collector 200 disposed in a portion between opposite surfaces of the electrode active material layer 100.

The first domain D1 is a region including the electrode active material layer 100 and the electrode current collector 200 disposed on one surface of the electrode active material layer 100. That is, the first domain D1 is a region that includes the electrode current collector 200 and the electrode active material layers 100 disposed on opposite surfaces of the electrode current collector in the thickness direction of the electrode. A second domain D2 is a region which includes the electrode active material layer 100 and does not include the electrode current collector 200 disposed between opposite surfaces of the electrode active material layer 100. That is, the second domain D2 is an electrode active material layer region other than the first domain D1. In FIG. 1B, the first domain D1 and the second domain D2 may be distinguished from each other by, for example, a virtual dotted line disposed along the thickness direction of the electrode. The mixture density of the electrode active material layer 100 included in the second domain D2 may be less than 99%, 98% or less, 97% or less, 96% or less, 95% or less, or 90% or less, of the mixture density of the electrode active material layer 100 included in the first domain D1. For example, the mixture density of the electrode active material layer 100 included in the second domain D2 may be about 50% to about 99%, about 60% to about 98%, about 70% to about 97%, about 80% to about 96%, or about 90% to about 95%, of the mixture density of the electrode active material layer 100 included in the first domain D1. In an embodiment, a total thickness T1 of the electrode active material layer 100 and the electrode current collector 200 included in the first domain D1 is substantially equal to a total thickness T2 of the electrode active material layer 100 included in the second domain. For example, the difference between the total thickness T1 of the electrode active material layer 100 and electrode current collector 200 included in the first domain D1 and the total thickness T2 of the electrode active material layer 100 included in the second domain may be less than 1%, 0.5% or less, or 0.1% or less.

Figure 2A:
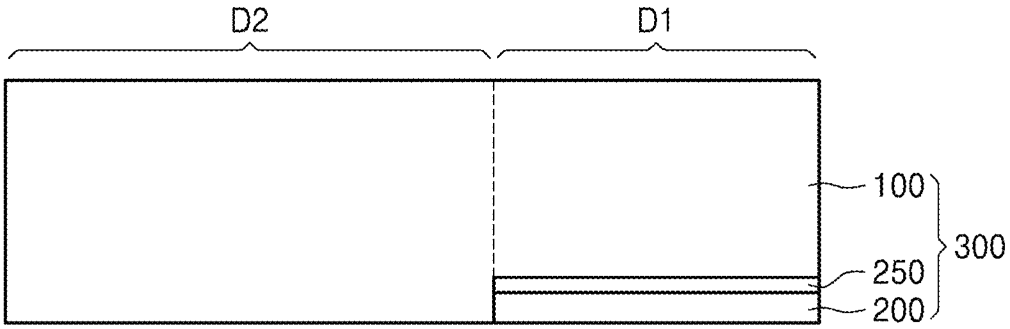
FIGS. 2A to 2B are cross-sectional views of an electrode according to an embodiment.

Referring to FIG. 2A, in an embodiment, an electrode 300 may include: the electrode active material layer 100 including an electrode active material and a binder; the electrode current collector 200 disposed on a portion of one surface of the electrode active material layer 100; and a coating layer 250 disposed between the electrode active material layer 100 and the electrode current collector 200. The electrode of FIG. 2A has the same configuration as the electrode of FIG. 1A except that the coating layer 250 is additionally included.

Figure 2B:
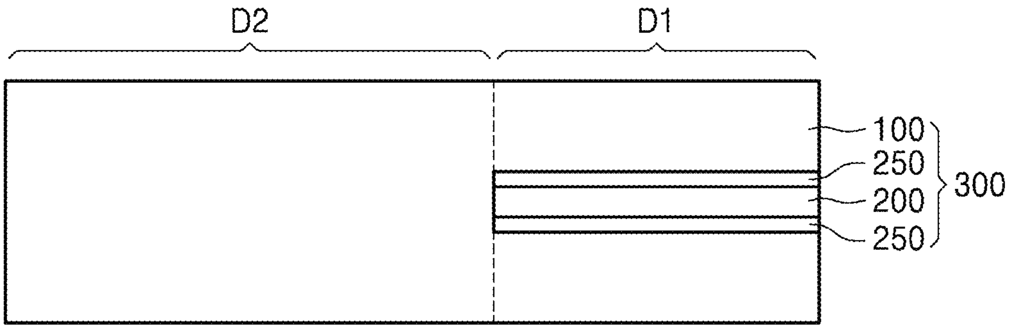

In an embodiment, referring to FIG. 2B, the electrode 300 may include: the electrode active material layer 100 including an electrode active material and a binder; the electrode current collector 200 disposed in a portion between opposite surfaces of the electrode active material layer 100; and a coating layer 250 disposed between the electrode active material layer 100 and the electrode current collector 200. The electrode of FIG. 2B has the same configuration as the electrode of FIG. 2A except that the coating layer 250 is additionally included.

Figure 3A:
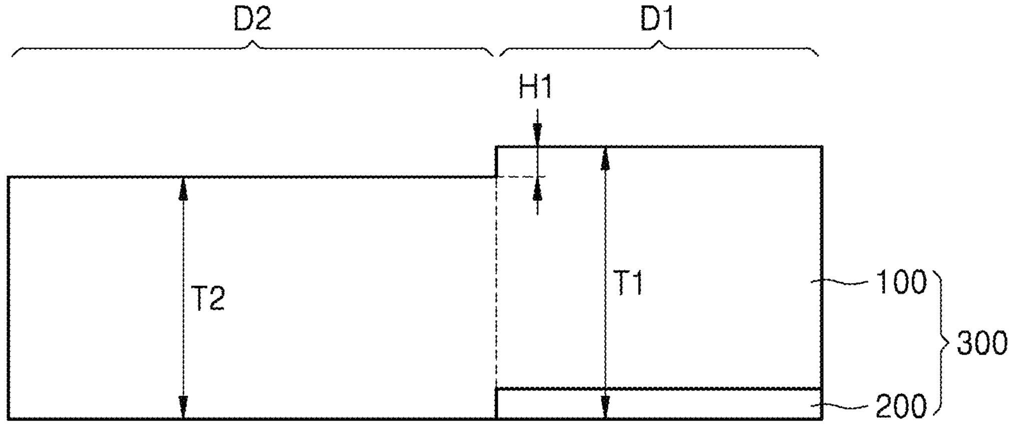
FIGS. 3A to 3B are cross-sectional views of an electrode according to an embodiment.

Referring to FIG. 3A, in an embodiment, an electrode 300 includes an electrode active material layer 100 including an electrode active material and a binder; and an electrode current collector 200 disposed on a part of one side of the electrode active material layer 100, wherein the total thickness T2 of the electrode active material layer 100 included in the second domain D2 may be 99% or less of the total thickness T1 of the electrode active material layer 100 and the electrode current collector 200 included in the first domain D1. The electrode 300 includes a surface step of the electrode active material layer 100 at the boundary between the first domain D1 and the second domain D2, and a height H1 of the surface step of the electrode active material layer 100 may be 1% or more of the total thickness T1 of the electrode active material layer 100 and the electrode current collector 200 included in the first domain D1. The electrode of FIG. 3A has the same structure as the electrode of FIG. 1A, except that the thickness of the second domain D2 and the thickness of the first domain D1 are different from each other.

Figure 3B:
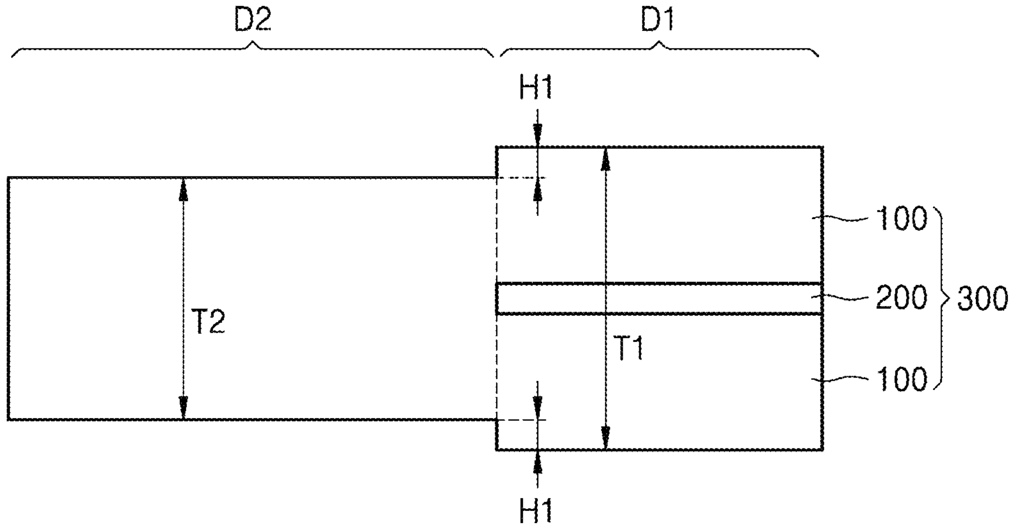

Referring to FIG. 3B, in an embodiment, an electrode 300 includes an electrode active material layer 100 including an electrode active material and a binder; and an electrode current collector 200 disposed in a portion between opposite surfaces of the electrode active material layer 100, wherein the total thickness T2 of the electrode active material layer 100 included in the second domain D2 may be 99% or less of the total thickness T1 of the electrode active material layer 100 and the electrode current collector 200 included in the first domain D1. The electrode 300 includes a surface step of the electrode active material layer 100 at the boundary between the first domain D1 and the second domain D2, and a height H1 of the surface step of the electrode active material layer 100 may be 1% or more of the total thickness T1 of the electrode active material layer 100 and the electrode current collector 200 included in the first domain D1. The electrode of FIG. 3B has the same structure as the electrode of FIG. 1B, except that the thickness of the second domain D2 and the thickness of the first domain D1 are different from each other.

Figure 4A:
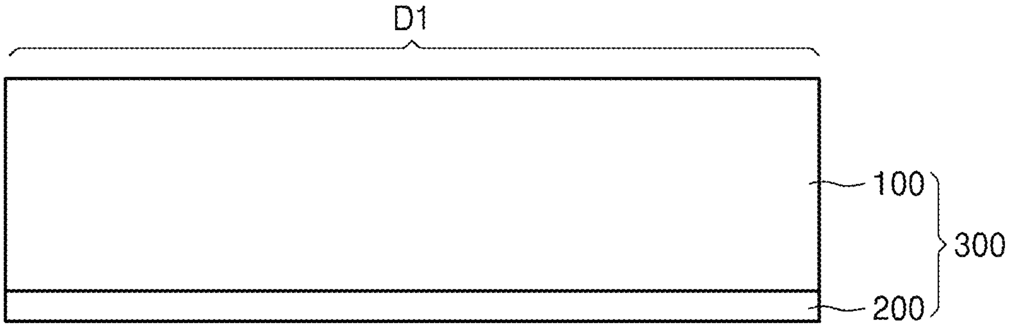
FIGS. 4A to 4B are cross-sectional views of an electrode according to an embodiment.

Referring to FIG. 4A, as an electrode of the related art, an electrode 300 includes an electrode active material layer 100 including an electrode active material and a binder, and an electrode current collector 200 disposed on the entire surface of the electrode active material layer 100.

The first domain D1 is a region including the electrode active material layer 100 and the electrode current collector 200 disposed on one surface of the electrode active material layer 100. That is, the first domain D1 is a region including the electrode current collector 200 and the electrode active material layer 100 disposed on one surface of the electrode current collector 200 in the thickness direction of the electrode. The electrode 300, as an electrode of the related art, does not have a second domain in which the electrode current collector 200 is not disposed on one surface of the electrode active material layer 100.

Figure 4B:
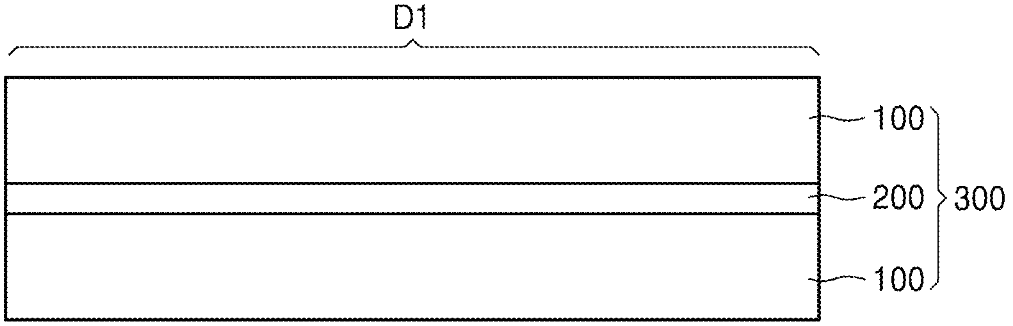

Referring to FIG. 4B, as an electrode of the related art, an electrode 300 includes an electrode active material layer 100 including an electrode active material and a binder, and an electrode current collector 200 disposed in the entire space between opposite surfaces of the electrode active material layer 100.

The first domain D1 is a region including the electrode active material layer 100 and the electrode current collector 200 disposed between opposite surfaces of the electrode active material layer 100. That is, the first domain D1 is a region including the electrode current collector 200 and the electrode active material layer 100 disposed between opposite surfaces of the electrode current collector in the thickness direction of the electrode. The electrode 300, as an electrode of the related art, does not have a second domain in which the electrode current collector 200 is not disposed between opposite surfaces of the electrode active material layer 100.

Figure 5:
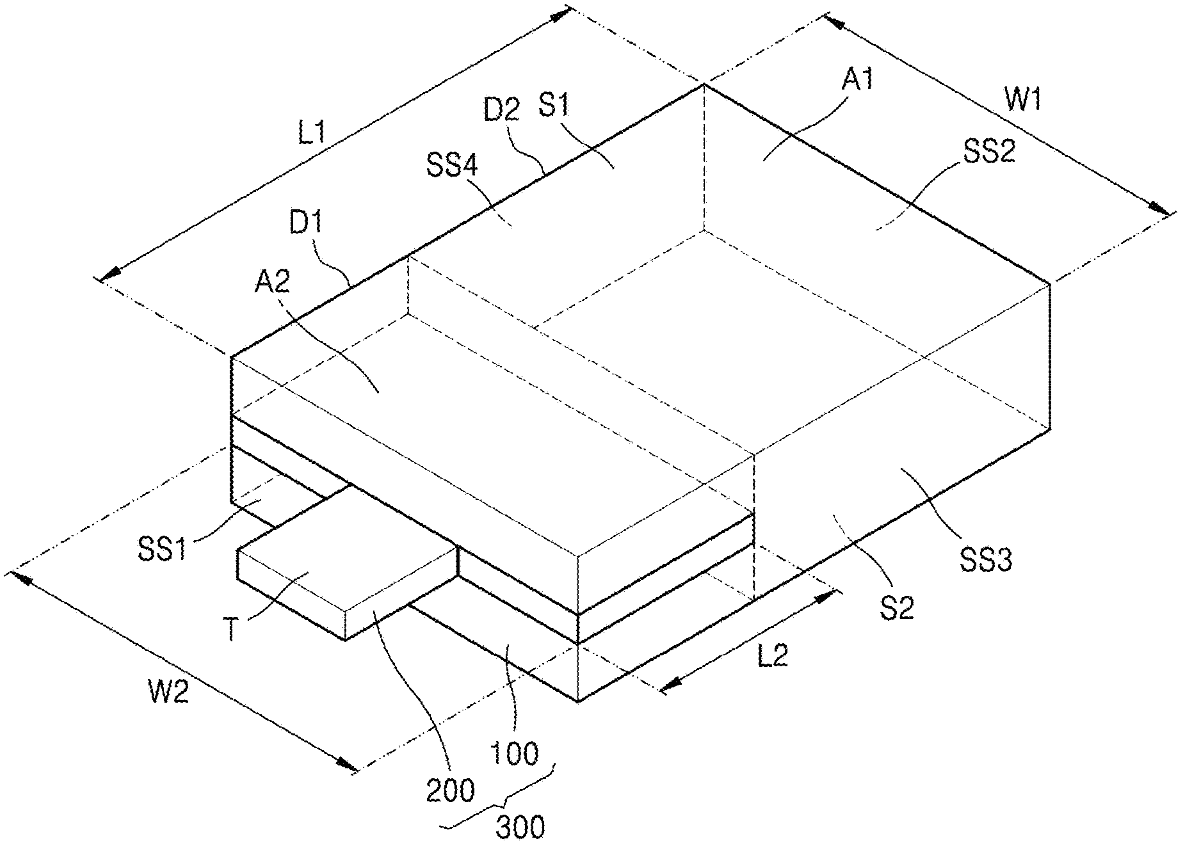
FIG. 5 is a cross-sectional view of an electrode according to an embodiment.

Referring to FIG. 5, in an electrode 300 according to an embodiment, the electrode active material layer 100 has a first surface S1 and a second surface S2 opposing the first surface S1, a first side surface SS1 and a second side surface SS2 opposing the first side surface SS1, which are connected to the longitudinal ends of the first surface S1 and the second surface S2, and a third side surface SS3 and a fourth side surface SS4 opposing the third side surface SS3, which are connected to the widthwise ends of the first surface S1 and the second surface S2. A first domain D1 is defined by the first surface S1, the second surface S2, the third side surface SS3, and the fourth side surface SS4, and includes the electrode current collector 100 disposed between the first surface S1 and the second surface S2. A second domain D2 is defined by the first surface S1, the second surface S2, the third side surface SS3, and the fourth side surface SS4, and is a domain that is free of the electrode current collector 200 between the first surface S1 and the second surface S2.

Referring to FIG. 5, the electrode active material layer 100 has a first area A1 defined by a lengthwise first distance L1 and a widthwise first distance W1, and the electrode current collector 200 is disposed between the first surface S1 and the second surface S2, and the electrode current collector 200 has a second area A2 defined by a lengthwise second distance L2 and a widthwise second distance W2, and the second area A2 of the electrode current collector 200 is 90% or less of the first area A1 of the electrode active material layer 100. For example, the second area A2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20%, of the first area A1 of the electrode active material layer 100. Since the area of the electrode current collector 200 in the electrode 300 is smaller than that of the electrode active material layer 100, the energy density of a lithium battery including the electrode 300 may be further improved.

Referring to FIG. 5, the lengthwise second distance L2 of the electrode current collector 200 is 90% or less of the lengthwise first distance L1 of the electrode active material layer 100. For example, the lengthwise second distance L2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20%, of the lengthwise first distance L1 of the electrode active material layer 100. Alternatively, the widthwise second distance W2 of the electrode current collector 200 may be less than or equal to 90% of the widthwise first distance W1 of the electrode active material layer 100. For example, the widthwise second distance W2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20%, of the widthwise first distance W1 of the electrode active material layer 100. For example, the lengthwise second distance L2 of the electrode current collector 200 may be 90% or less of the lengthwise first distance L1 of the electrode active material layer 100, and the widthwise second distance W2 of the electrode current collector 200 may be 90% or less of the widthwise first distance W1 of the electrode active material layer 100. As the electrode current collector 200 has such sizes, the energy density of the lithium battery 1000 including the electrode 300 may be further improved.

Referring to FIG. 5, the electrode current collector 200 is exposed on three or less side surfaces of the first side surface SS1, the second side surface SS2, the third side surface SS3, and the fourth side surface SS4 included in the electrode active material layer 100. Since the electrode current collector 200 has a smaller area than that of the electrode active material layer 100, the electrode current collector 200 may be exposed to some of the side surfaces of the electrode active material layer 100, for example, three, two, or one side surfaces thereof. As the number of side surfaces of the electrode active material layer 100 to which the electrode current collector 200 is exposed decreases, the possibility of a short circuit through the side surface of the electrode active material layer 100 is reduced, so that the safety of the lithium battery 1000 is improved.

Referring to FIG. 5, the electrode current collector 200 has a tab T extending to the outside of the electrode active material layer 100 through two or less sides selected from the first side surface SS1, the second side surface SS2, the third side surface SS3, and the fourth side surface SS4. For example, the tab T extends to the outside of the electrode active material layer 100 through the first side surface SS1 and/or the second side surface SS2. Alternatively, the tab T extends to the outside of the electrode active material layer 100 through the third side surface SS3 and/or the fourth side surface SS4. As the tab T extends to the outside of the electrode active material layer 100 through one side surface or two opposite side surfaces, a short circuit by a plurality of adjacent tabs may be prevented.

Referring to FIGS. 6A to 6F, the electrode current collector 200 disposed in a portion between opposite surfaces of the electrode active material layer 100 may have various shapes and may be disposed at various positions within the electrode active material layer 100. In FIGS. 6A to 6F, with respect to the electrode active material layer 100 defined by the first side surface SS1, the second side surface SS2, the third side surface SS3 and the fourth side surface SS4, a region in which the electrode current collector 200 is disposed corresponds to a first domain, and a region that is free of the electrode current collector 200 corresponds to a second domain.

Figure 6A:
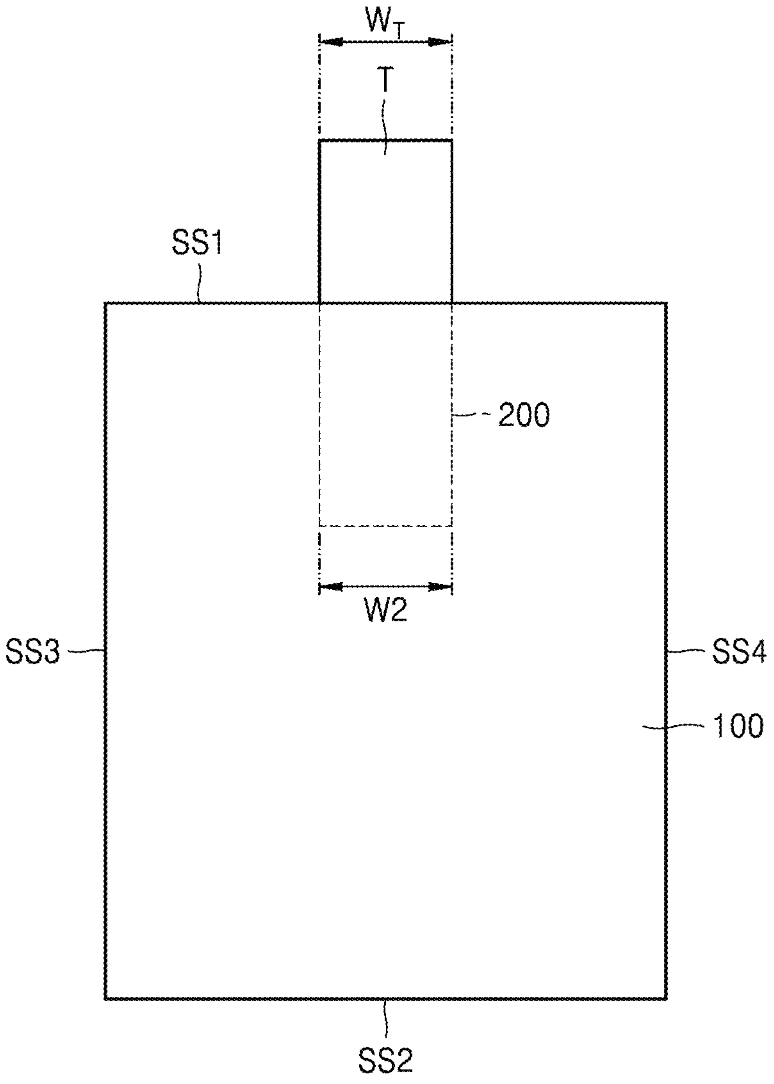
FIGS. 6A to 6F are plan views of an electrode according to an embodiment.

Referring to FIG. 6A, the electrode current collector 200 may be disposed in a portion of the electrode active material layer 100 defined by the first side surface SS1, the second side surface SS2, the third side surface SS3, and the fourth side surface SS4. The electrode current collector 200 is exposed by the first side surface SS1 of the electrode active material layer 100, and includes a tab T extending to the outside of the electrode active material layer 100 through the first side surface SS1. The widthwise distance $W_T$ of the tap T may be 100% of the widthwise second distance W2 of the electrode current collector 200.

Figure 6B:
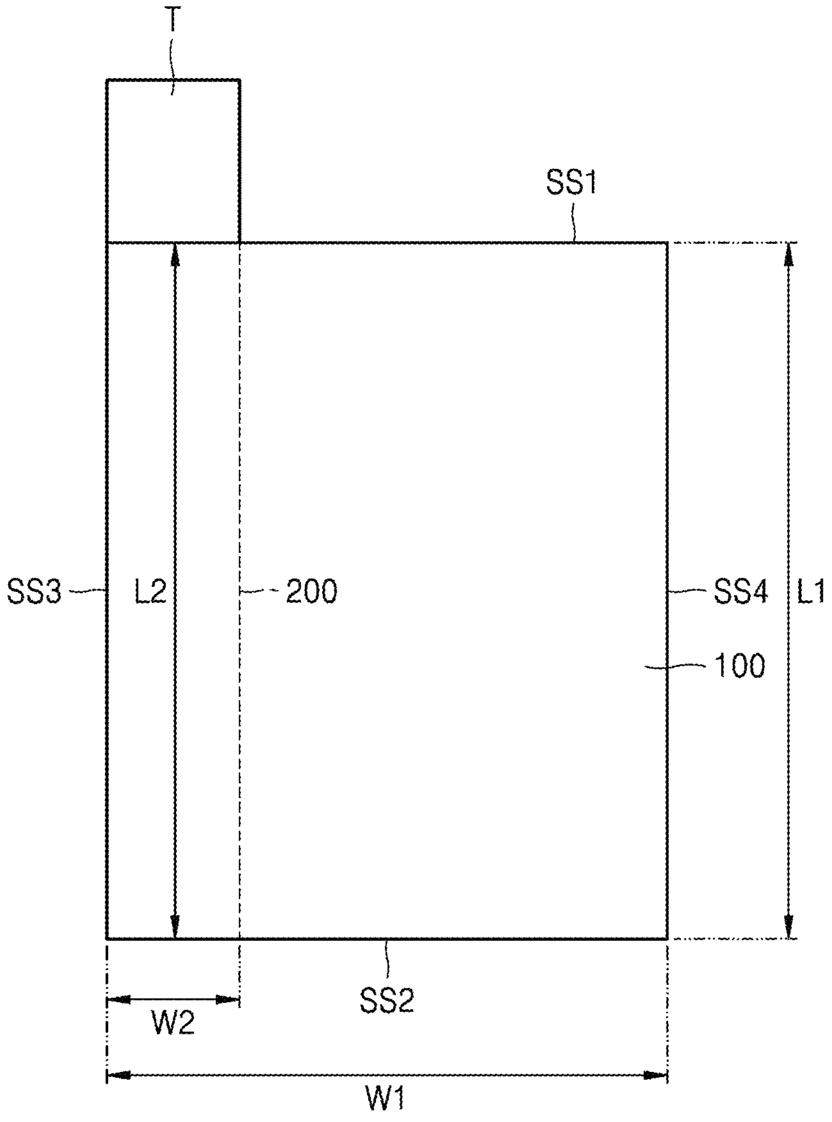

Referring to FIG. 6B, the electrode current collector 200 may be disposed in a portion of the electrode active material layer 100 defined by the first side surface SS1, the second side surface SS2, the third side surface SS3, and the fourth side surface SS4. The electrode current collector 200 is exposed by the first side surface SS1, the second side surface SS2, and the third side surface SS3 of the electrode active material layer 100, and includes a tab T extending to the outside of the electrode active material layer 100 through the first side surface SS1. The lengthwise second distance L2 of the electrode current collector 200 may be 100% of the lengthwise first distance L1 of the electrode active material layer 100. The widthwise second distance W2 of the electrode current collector 200 may be less than 100% of the widthwise first distance W1 of the electrode active material layer 100.

Figure 6C:
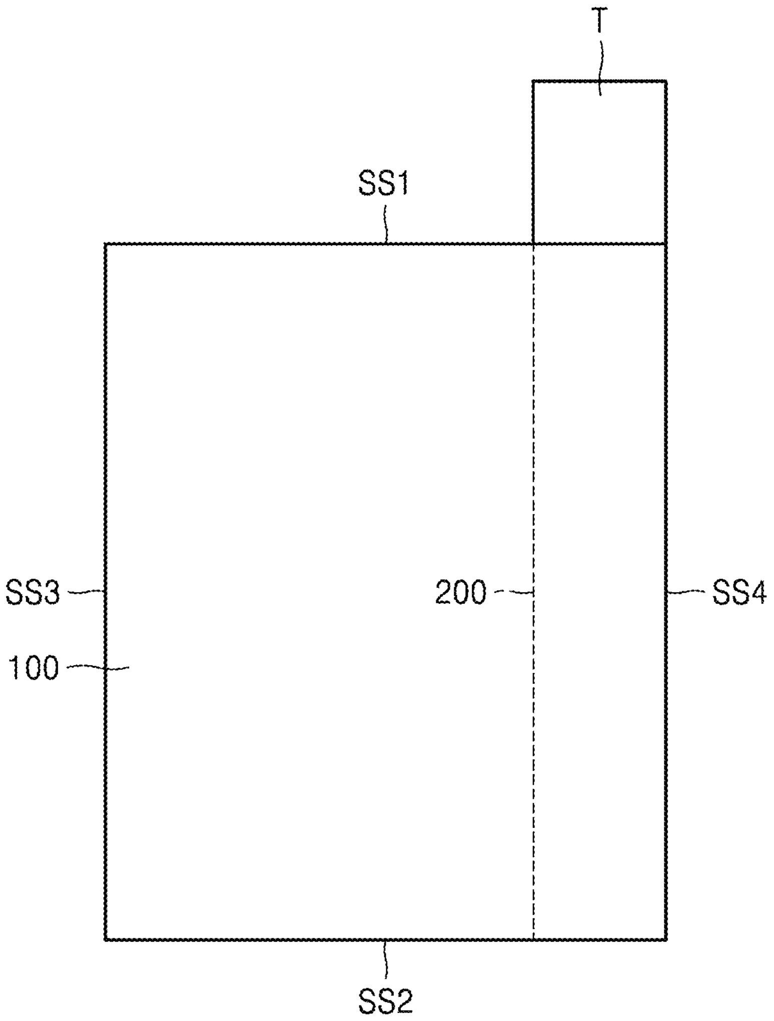

Referring to FIG. 6C, the electrode current collector 200 may be disposed in a portion of the electrode active material layer 100 defined by the first side surface SS1, the second side surface SS2, the third side surface SS3, and the fourth side surface SS4. The electrode current collector 200 is exposed by the first side surface SS1, the second side surface SS2, and the fourth side surface SS4 of the electrode active material layer 100, and includes a tab T extending to the outside of the electrode active material layer 100 through the first side surface SS1.

Figure 6D:
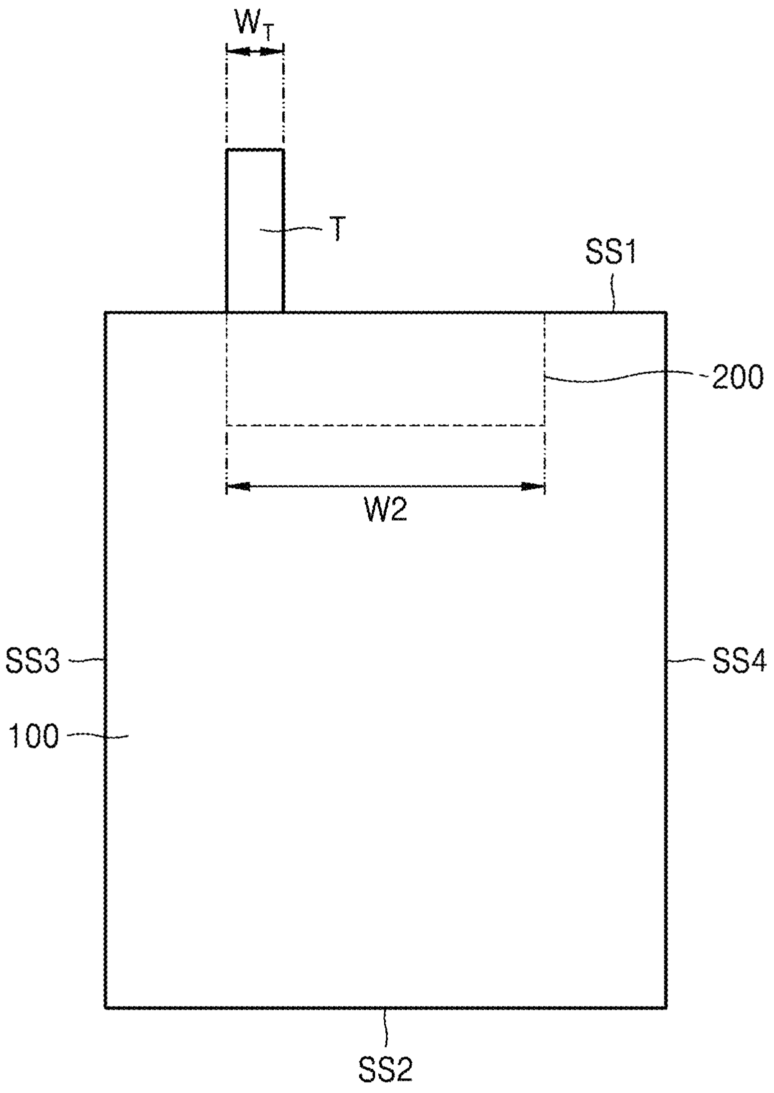

Referring to FIG. 6D, the electrode current collector 200 may be disposed in a portion of the electrode active material layer 100 defined by the first side surface SS1, the second side surface SS2, the third side surface SS3, and the fourth side surface SS4. The electrode current collector 200 is exposed by the first side surface SS1 of the electrode active material layer 100, and includes a tab T extending to the outside of the electrode active material layer 100 through the first side surface SS1. The widthwise distance $W_T$ of the tap T may be less than 100% of the widthwise second distance W2 of the electrode current collector 200.

Figure 6E:
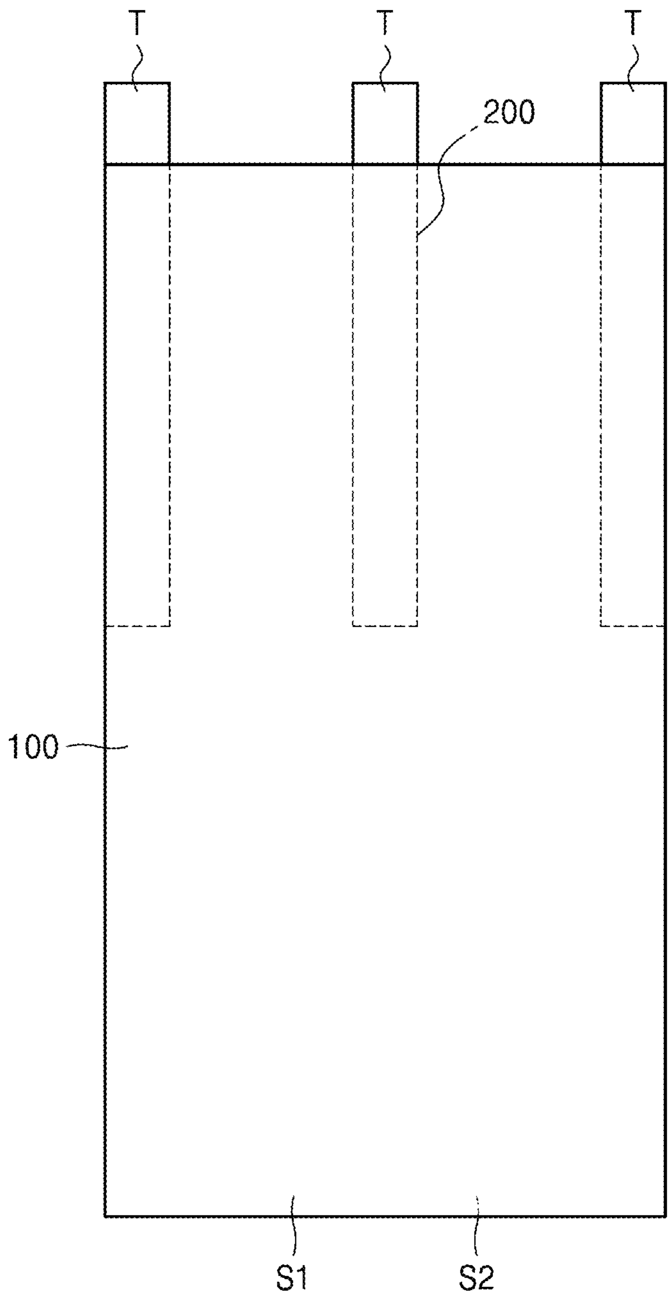
Figure 6F:
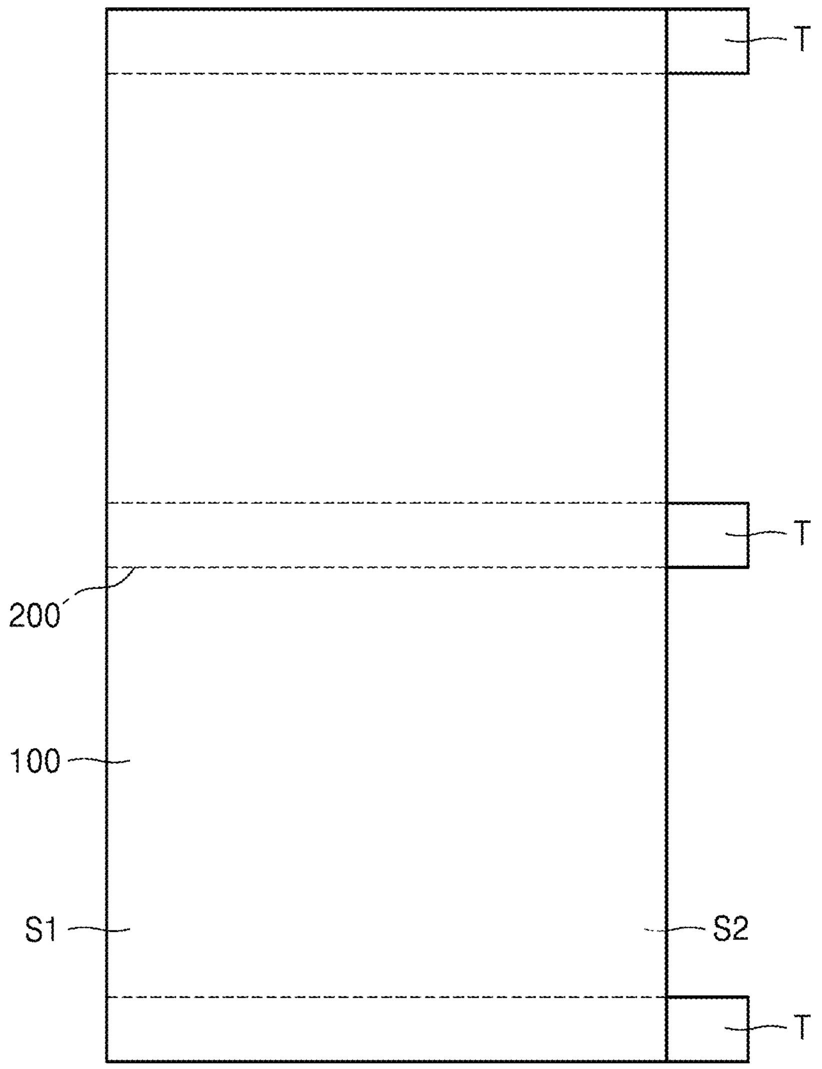

Referring to FIGS. 6E and 6F, a plurality of electrode current collectors 200 may be disposed in a portion of the electrode active material layer 100 defined by the first side surface SS1, the second side surface SS2, the third side surface SS3, and the fourth side surface SS4. The plurality of electrode current collectors 200 are spaced apart from each other in a longitudinal direction or a width direction of the electrode active material layer 100. In an embodiment, the plurality of electrode current collectors 200 may be spaced apart from each other at identical intervals or at different intervals. The plurality of electrode current collectors 200 may form an angle of 45 degrees or less, 40 degrees or less, 30 degrees or less, 25 degrees or less, 20 degrees or less, 15 degrees or less, 10 degrees or less, and 5 degrees or less, with respect to one surface of the electrode active material layer 100, for example, at least one of the first surface S1 and the second surface S2 thereof. For example, the plurality of electrode current collectors 200 may form an angle of 0 degrees with one surface of the electrode active material layer 100, that is, are disposed in parallel thereto. In an embodiment, the plurality of electrode current collectors 200 may be disposed between the first surface S1 and the second surface S2 of the electrode active material layer 100.

Figure 7:
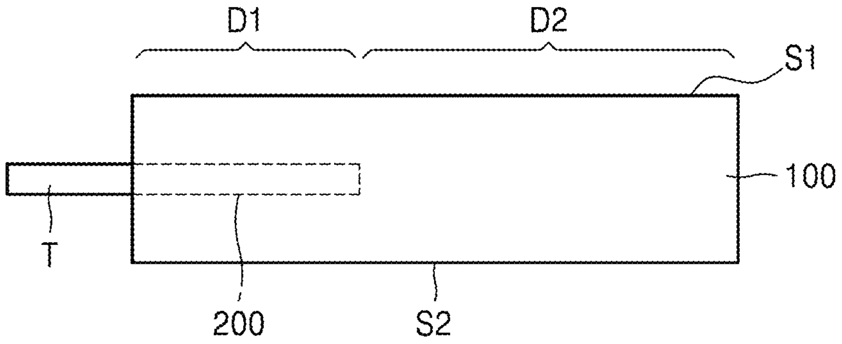
FIG. 7 is a cross-sectional view of an electrode according to an embodiment.

Referring to FIG. 7, the electrode active material layer 100 includes: a first domain D1 in which the electrode current collector 200 is disposed between the first surface S1 and the second surface S2; and a second domain D2 in which the electrode current collector 200 is not disposed between the first surface S1 and the second surface S2. The mixture density of the electrode active material layer 100 included in the second domain D2 may be less than 99%, 98% or less, 97% or less, 96% or less, 95% or less, or 90% or less, of the mixture density of the electrode active material layer 100 included in the first domain D1. For example, the mixture density of the electrode active material layer 100 included in the second domain D2 may be about 50% to about 99%, about 60% to about 98%, about 70% to about 97%, about 80% to about 96%, or about 90% to about 95%, of the mixture density of the electrode active material layer 100 included in the first domain D1.

A lithium battery according to an embodiment includes a positive electrode, a negative electrode, and an electrolyte located between the positive electrode and the negative electrode, wherein at least one of the positive electrode and the negative electrode is the electrode described above.

Figure 8:
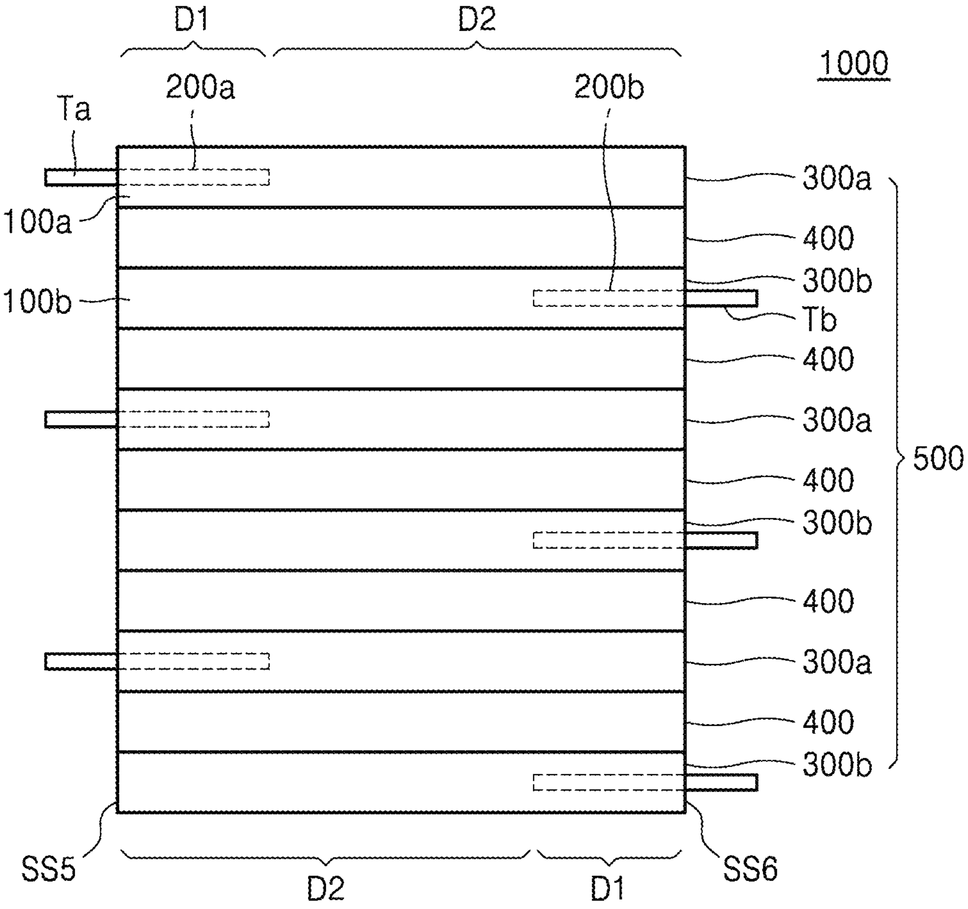
FIG. 8 is a side view of an electrode assembly according to an embodiment.
Figure 9:
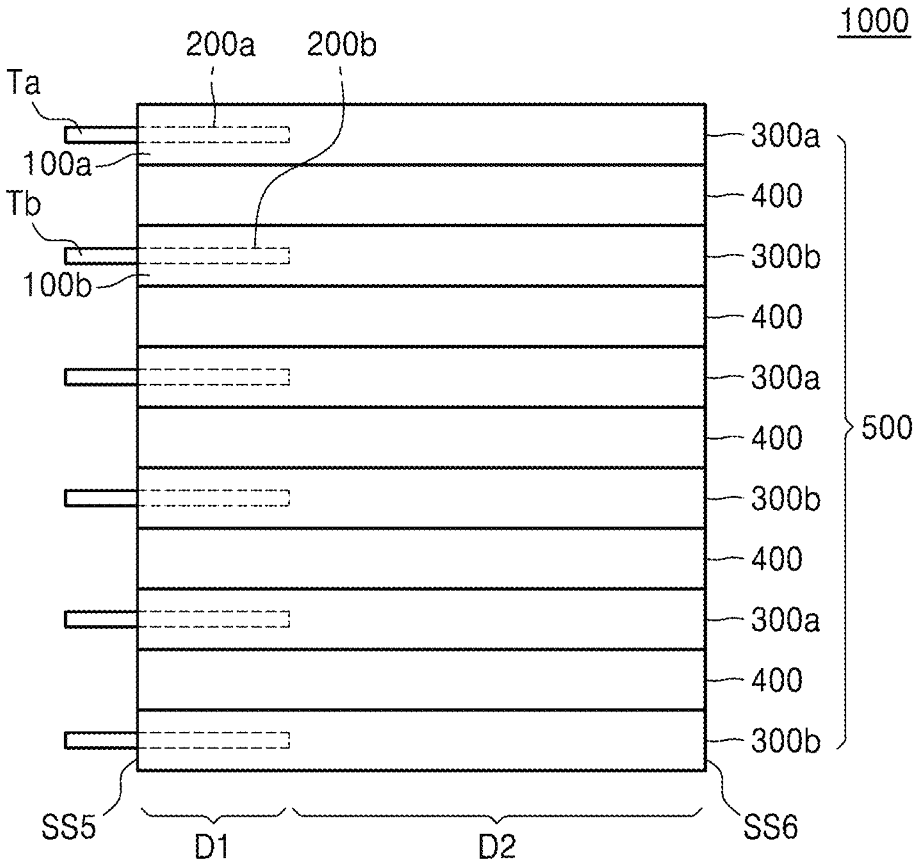
FIG. 9 is a side view of an electrode assembly according to an embodiment.
Figure 10:
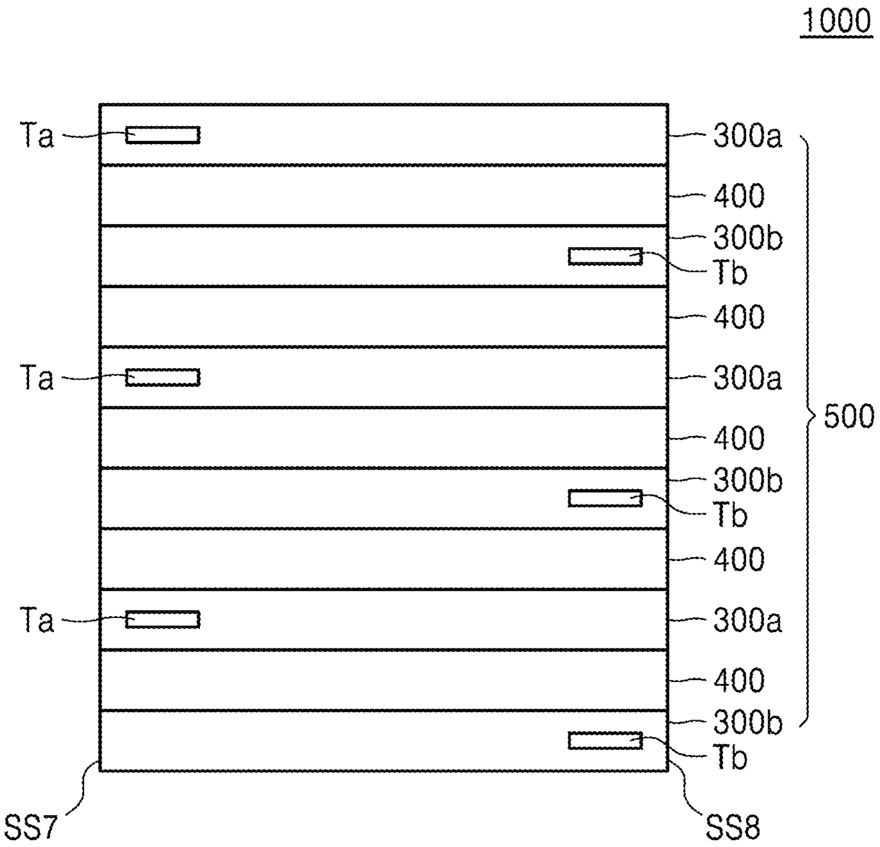
FIG. 10 is a front view of an electrode assembly according to an embodiment.

Referring to FIGS. 8 to 10, a lithium battery 1000 includes a positive electrode 300*a*, a negative electrode 300*b*, and an electrolyte 400 disposed between the positive electrode 300*a* and the negative electrode 300_b_, wherein at least one of the positive electrode 300_a_ and the negative electrode 300_b_ is the electrode described above. The lithium battery 1000 includes an electrode assembly 500.

Referring to FIG. 8, the electrode assembly 500 includes: a plurality of positive electrodes 300_a_ stacked along a thickness direction thereof; a plurality of negative electrodes 300_b_, each disposed between adjacent positive electrodes of the plurality of positive electrodes 300_a_; a plurality of electrolytes 400 disposed between the plurality of positive electrodes 300_a_ and the plurality of negative electrodes 300_b_. The positive electrode 300_a_ includes a positive electrode current collector 200_a_, and the positive electrode current collector 200_a_ includes a positive electrode tab Ta extending to the outside of a positive electrode active material layer 100_a_ through a side surface SS5 of the electrode assembly 500, and the negative electrode 300_b_ includes a negative electrode current collector 200_b_, the negative electrode current collector 200_b_ includes a negative electrode tab Tb extending to the outside of a negative electrode active material layer 100_b_ through another surface SS6 opposing the side surface SS5 of the electrode assembly 500. The lithium battery 1000 includes an electrode assembly 500. Since the positive electrode tab Ta and the negative electrode tab Tb are disposed on side surfaces opposing each other, the possibility of a short circuit therebetween is reduced.

Referring to FIG. 9, the electrode assembly 500 includes: a plurality of positive electrodes 300_a_ stacked along a thickness direction thereof; a plurality of negative electrodes 300_b_, each disposed between adjacent positive electrodes of the plurality of positive electrodes 300_a_; a plurality of electrolytes 400 disposed between the plurality of positive electrodes 300_a_ and the plurality of negative electrodes 300_b_. The positive electrode 300_a_ includes a positive electrode current collector 200_a_, and the positive electrode current collector 200_a_ includes a positive electrode tab Ta extending to the outside of a positive electrode active material layer 100_a_ through a side surface SS5 of the electrode assembly 500, and the negative electrode 300_b_ includes a negative electrode current collector 200_b_, the negative electrode current collector 200_b_ includes a negative electrode tab Tb extending to the outside of a negative electrode active material layer 100_b_ through the side surface SS5 of the electrode assembly 500. The lithium battery 1000 includes an electrode assembly 500.

Figure 11:
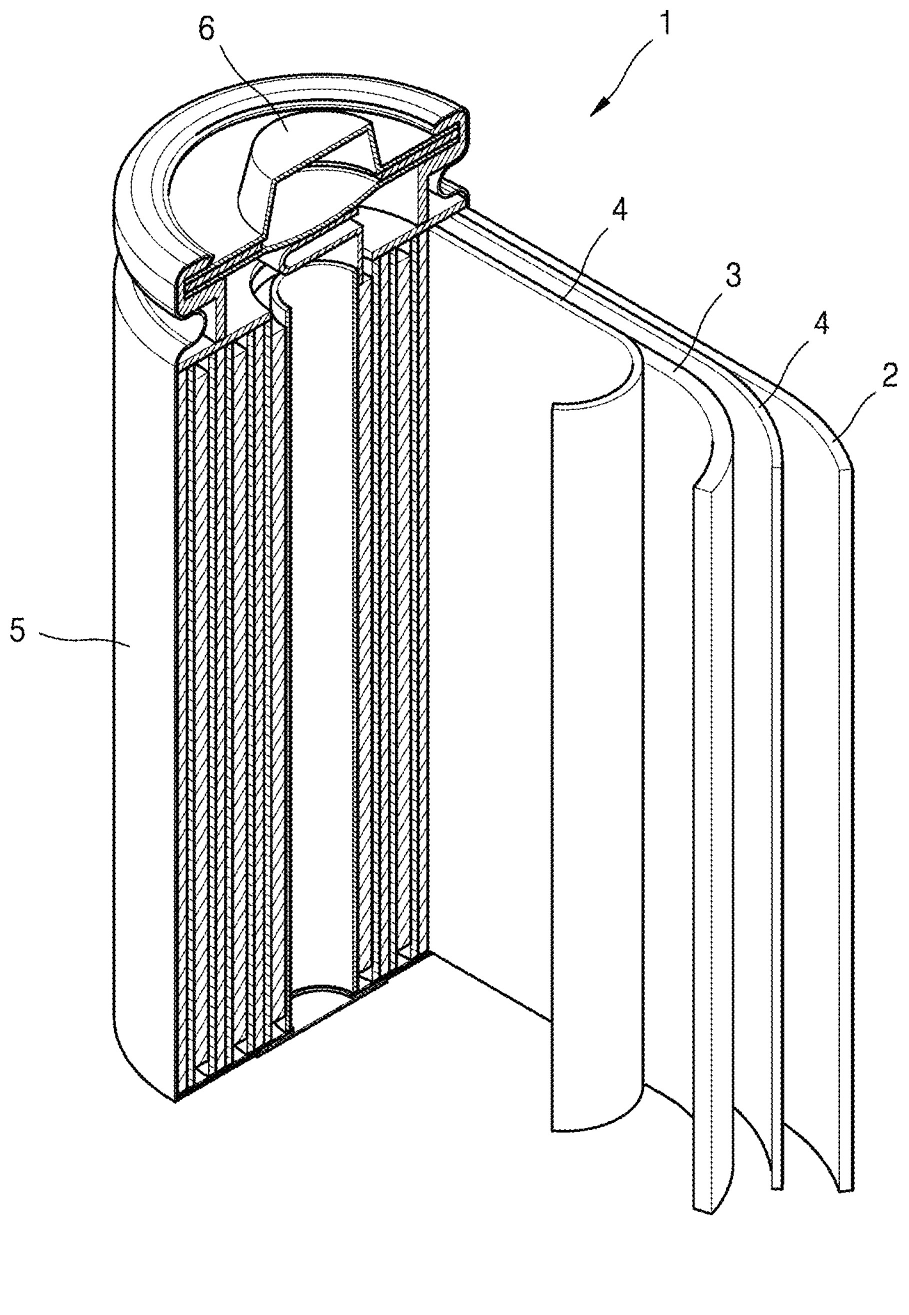
FIG. 11 is a schematic diagram of a lithium battery according to an embodiment.

Referring to FIG. 10, a plurality of positive electrode tabs Ta are disposed at regular intervals on the side surface SS5 in a thickness direction of the electrode assembly 500, and a plurality of negative electrode tabs Tb are disposed at regular intervals in the thickness direction thereof. The plurality of positive electrode tabs Ta are disposed adjacent to a side surface SS7 in the width direction of the electrode assembly 500, and the plurality of negative electrode tabs Tb are disposed adjacent to another side surface SS8 opposing the side surface SS7 in the width direction of the electrode assembly 500. FIG. 11 is a front view of the side surface SS5 of FIG. 10. The lithium battery 1000 includes an electrode assembly 500.

Although the positive electrodes tab Ta and the negative electrodes tab Tb are disposed on the same side surface, since they are disposed to be spaced apart from each other in the width direction, the possibility of a short circuit therebetween is reduced.

The lithium battery 1000 may be, for example, a lithium ion battery, a lithium solid battery, and a lithium air battery.

A method of manufacturing an electrode according to an embodiment is provided.

The method of manufacturing an electrode includes: preparing a mixture by dry mixing an electrode active material, a dry conductive material, and a dry binder; providing an electrode current collector; and disposing and pressing the mixture on one surface or opposite surfaces of the electrode current collector to manufacture an electrode in which an electrode active material layer is disposed on one surface or opposite surfaces of the electrode current collector, wherein the electrode includes a first domain including the electrode active material layer and the electrode current collector disposed on one surface or between opposite surfaces of the electrode active material layer; and a second domain which includes the electrode active material layer and is free of the electrode current collector on one surface or between opposite surfaces of the electrode active material layer, and the mixture density of the electrode active material layer included in the second domain is less than 99% of the mixture density of the electrode active material layer included in the first domain.

In the electrode manufactured by this manufacturing method, the uniformity of a uniform binding force distribution within the electrode is improved and thus the performance of a lithium battery using this electrode is improved. In addition, in the electrode manufactured by this manufacturing method, the electrode current collector is disposed in a part of the electrode, and the mixture density of the electrode active material layer of the region where the electrode current collector is disposed, is greater than the mixture density of the electrode active material layer in the region where the electrode current collector is not disposed, the cyclic characteristics of a lithium battery using this electrode may be improved.

First, a mixture is prepared by dry mixing an electrode active material, a dry conductive material, and a dry binder. Dry mixing refers to mixing while a processing solvent is not included. The processing solvent may be, for example, solvents used in the preparation of electrode slurries. The processing solvent may be, for example, water, NMP, etc., but is not limited thereto, and any processing solvent that is used in the preparation of an electrode slurry, may be used herein. Dry mixing may be performed using a stirrer at the temperature of, for example, 25° C. to 65° C. Dry mixing may be performed using a stirrer at a rotation speed of, for example, about 10 rpm to about 10000 rpm, or about 100 rpm to about 10000 rpm. Dry mixing may be performed using a stirrer, for example, for about 1 minute to about 200 minutes, or about 1 minute to about 150 minutes.

Dry mixing may be performed, for example, one or more times. First, a first mixture may be prepared by primary dry mixing an electrode active material, a dry conductive material, and a dry binder. The primary dry mixing may be performed, for example, at a temperature of 25° C. to 65° C., at a rotation speed of 2000 rpm or less, for 15 minutes or less. The primary dry mixing may be performed, for example, at a temperature of about 25° C. to about 65° C., at a rotation speed of about 500 rpm to about 2000 rpm, for about 5 minutes to about 15 minutes. The electrode active material, the dry conductive material, and the dry binder may be uniformly mixed by the primary dry mixing. Subsequently, a second mixture may be prepared by secondary dry mixing an electrode active material, a dry conductive material, and a dry binder. The secondary dry mixing may be performed, for example, at a temperature of 25° C. to 65° C., at a rotation speed of 4000 rpm or more, and for 10 minutes or more. The secondary dry mixing may be performed, for example, at a temperature of 25° C. to 65° C., at a rotation speed of about 4000 rpm to about 9000 rpm, for 10 minutes to 60 minutes. A dry mixture including a fibrillated dry binder may be obtained by secondary dry mixing.

The stirrer may be, for example, a kneader. The stirrer may include: for example, a chamber; one or more rotating shafts which are located inside the chamber and rotate; and a blade rotatably coupled to the rotation shafts and located in the longitudinal direction of the rotation shafts. The blade may be, for example, one or more selected from a ribbon blade, a sigma blade, a jet (Z) blade, a dispersion blade, and a screw blade. By including the blade, a dough-like mixture can be prepared by effectively mixing the electrode active material, the dry conductive material, and the dry binder, even without a solvent.

The prepared mixture may be put into an extrusion device and extruded into a sheet form. The pressure at the time of extrusion may be, for example, about 4 MPa to about 100 MPa, or about 10 MPa to about 90 MPa. The resulting mixture may be in sheet form. That is, the obtained mixture may be an electrode active material layer.

As the dry conductive material, carbon black, graphite fine particles, natural graphite, artificial graphite, acetylene black, Ketjen black, carbon fiber; carbon nanotubes; metal powder, metal fiber or metal tube of, for example, copper, nickel, aluminum, or silver; or conductive polymers such as polyphenylene derivatives may be used, but the disclosure is not limited thereto. Any conductive material may be used as long as it is used in the art. The conductive material may be, for example, a carbon-based conductive material.

Examples of the dry binder include vinylidene fluoride/hexafluoropropylene copolymer, polyvinylidene fluoride, polyacrylonitrile, polymethylmethacrylate, polytetrafluoroethylene (PTFE), mixtures of these polymers, and styrene butadiene A rubber-based polymer, and as the solvent, N-methylpyrrolidone (NMP), acetone, water, etc. are used, but are not limited thereto, and any solvent used in the art may be used.

A plasticizer or a pore former may be further added to the electrode active material composition to form pores inside the electrode plate.

The amounts of the electrode active material, the dry conductive material, and the dry binder which are used in an electrode active material layer may be the same as described above in connection with an electrode.

The positive electrode uses a positive electrode active material as an electrode active material. The positive electrode active material may be understood by referring to the description provided in connection with the electrode. The negative electrode uses a negative electrode active material as an electrode active material. The negative electrode active material may be understood by referring to the description provided in connection with the electrode.

Next, an electrode current collector is provided.

The electrode current collector may additionally include a coating layer disposed on one surface or opposite surfaces of the electrode current collector.

The providing the electrode current collector may include, for example, disposing a coating layer on one surface or opposite surfaces of the electrode current collector.

A material for the electrode current collector may be understood by referring to the description provided in connection with the electrode current collector. A positive electrode current collector may be, for example, aluminum foil. A negative electrode current collector may be, for example, copper foil.

In the disposing the coating layer on one or both surfaces of the electrode current collector, the coating layer may be disposed on one surface or opposite surfaces of the electrode current collector by a dry or wet method. The specific coating method may be understood by referring to the description provided in connection with the electrode current collector including the coating layer.

Next, the mixture is disposed and pressed on one surface or between opposite surfaces of the electrode current collector to manufacture an electrode including the electrode active material layer on one surface or opposite surfaces of the electrode current collector. The pressing may be, for example, a roll press, a flat press, or the like, but is not necessarily limited thereto. The pressure during pressing may be, for example, 1.0 ton/cm$^2$ to 10.0 ton/cm$^2$. When the pressure during pressing is excessively increased, a thin-film electrode current collector may crack. When the pressure during pressing is too low, the binding force between the electrode current collector and the electrode active material layer may be reduced.

The lithium battery is manufactured by the following example method, but the disclosure is not necessarily limited to this method and the method may vary according to required conditions.

First, one or all of the positive electrode and the negative electrode may be manufactured according to the electrode manufacturing method described above. Alternatively, when one of the positive electrode and the negative electrode is manufactured by the electrode manufacturing method described above, the other electrode may be manufactured by the wet manufacturing method. For example, another electrode may be prepared by preparing an electrode slurry including an electrode active material, a conductive material, a binder, and a solvent, and coating the prepared electrode slurry on an electrode current collector and drying the same. The conductive material and binder included in an electrode prepared using a wet method may be selected from the conductive material and the binder which are used in the production of the dry electrode.

Next, a separator to be inserted between the positive electrode and the negative electrode is prepared.

As for the separator, any one that is typically used in a lithium battery can be used. As the separator, for example, any separator that has low resistance to ion migration of the electrolyte and excellent ability to absorb the electrolyte, may be used. The separator may be a non-woven fabric or a woven fabric including at least one selected from fiberglass, polyester, Teflon, polyethylene, polypropylene, polytetrafluoroethylene (PTFE), and a combination thereof. For lithium-ion batteries, separators that can be wound, such as polyethylene and polypropylene, are used, and for lithium-ion polymer batteries, separators with excellent organic electrolyte-solution wetting ability may be used.

The separator is manufactured by the following example method, but the disclosure is not necessarily limited to this method and is adjusted according to required conditions.

First, a separator composition is prepared by mixing a polymer resin, a filler, and a solvent. The separator composition is directly coated and dried on the electrode to form a separator. Alternatively, after a separator composition is cast and dried on a support, a separator film peeled off from the support is laminated on the electrode to form a separator.

The polymer used to manufacture the separator is not particularly limited, and any polymer used for the binder of an electrode plate may be used. For example, a vinylidene fluoride/hexafluoropropylene copolymer, polyvinylidene fluoride (PVDF), polyacrylonitrile, polymethyl methacrylate, or mixtures thereof may be used.

Next, an electrolyte is prepared.

The electrolyte may be, for example, an organic electrolyte solution. In an embodiment, the organic electrolyte solution may be prepared by dissolving a lithium salt in an organic solvent.

Any organic solvent that can be used as an organic solvent in the art, may be used as the organic solvent herein. The organic solvent may be, for example, propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, y-butyrolactone, dioxolane, 4-methyldioxolane, N, N-dimethylformamide, dimethylacetamide, dimethylsulfoxide, dioxane, 1,2-dimethoxyethane, sulfolane, dichloroethane, chlorobenzene, nitrobenzene, diethylene glycol, dimethylether, or a mixture thereof.

Any lithium salt may be used as long as it is used as a lithium salt in the art. The lithium salt is, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, LiAlClA, $LiN(C_xF_{2x+1}SO_2)(C_yF_{2y+1}SO_2)$ (here, x and y are natural numbers), LiCl, LiI, or a mixture thereof.

Alternatively, the electrolyte may be a solid electrolyte. The solid electrolyte is, for example, boron oxide, lithium oxynitride, etc., but is not limited thereto, and any solid electrolyte used in the art can be used herein. The solid electrolyte may be formed on the negative electrode by a method such as sputtering, or a separate solid electrolyte sheet is laminated on the negative electrode. The solid electrolyte may be, for example, an oxide-based solid electrolyte or a sulfide-based solid electrolyte.

Referring to FIG. 11, a lithium battery 1 according to an embodiment includes a positive electrode 3, a negative electrode 2, and a separator 4. The positive electrode 3, the negative electrode 2, and the separator 4 may be wound or folded to form a battery structure 7. The battery structure 7 is accommodated in a battery case 5. An organic electrolyte is injected into the battery case 5 and sealed with a cap assembly 6 to complete the manufacture of the lithium battery 1. The battery case 5 may be cylindrical, but not necessarily limited to such a shape, for example, a prismatic shape, a thin film shape, and the like.

Figure 12:
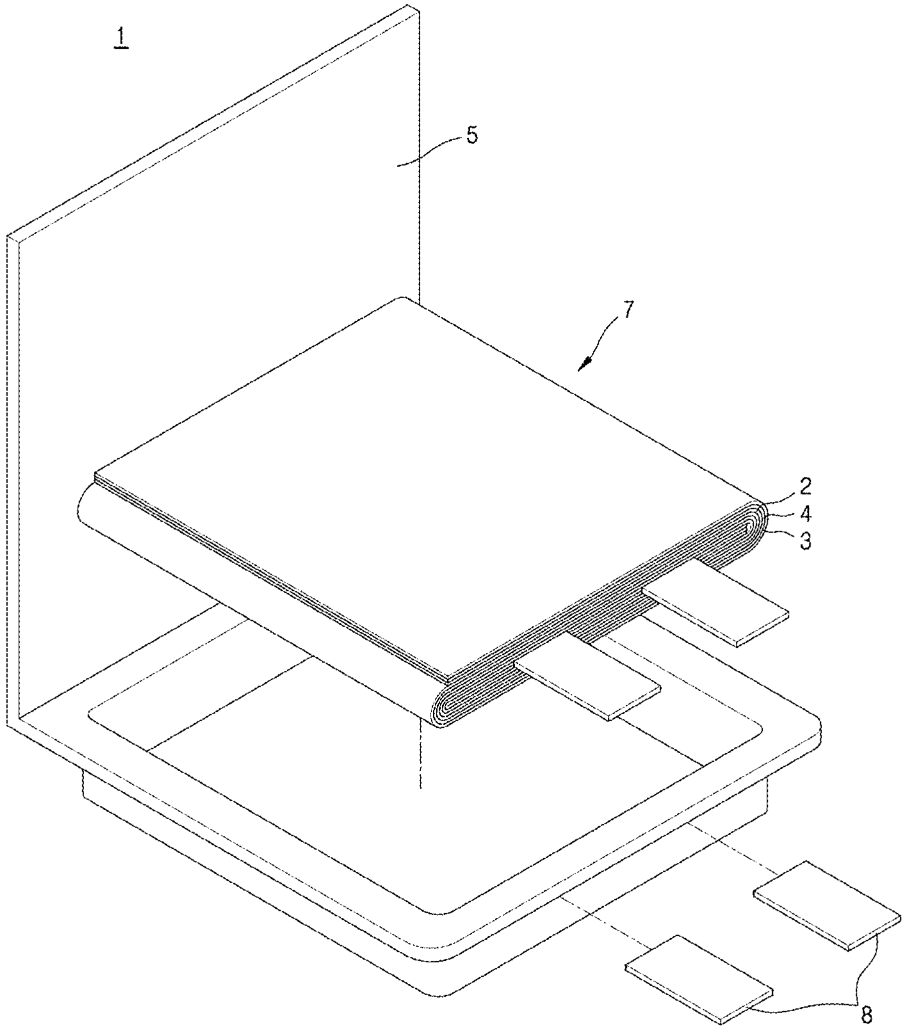
FIG. 12 is a schematic diagram of a lithium battery according to an embodiment.

Referring to FIG. 12, a lithium battery 1 according to an embodiment includes a positive electrode 3, a negative electrode 2, and a separator 4. The separator 4 may be located between the positive electrode 3 and the negative electrode 2, and the positive electrode 3 the negative electrode 2, and the separator 4 may be wound or folded to form a battery structure 7. The battery structure 7 is accommodated in a battery case 5. An electrode tab 8 acting as an electrical path for inducing the current formed in the battery structure 7 to the outside may be included. An organic electrolyte is injected into the battery case 5 and sealed to complete the manufacture of the lithium battery 1. The battery case 5 may have a rectangular shape, but is not necessarily limited to such a shape, and may have, for example, a cylindrical shape, a thin film type, or the like.

Figure 13:
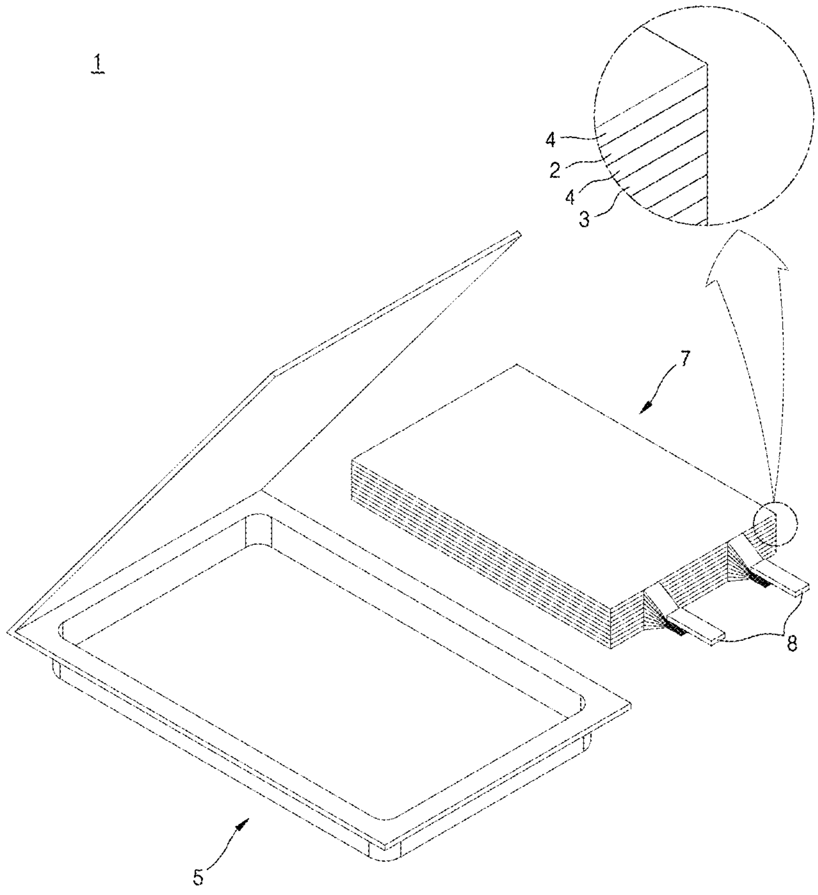
FIG. 13 is a schematic diagram of a lithium battery according to an embodiment.

Referring to FIG. 13, a lithium battery 1 according to an embodiment includes a positive electrode 3, a negative electrode 2, and a separator 4. The separator 4 is located between the positive electrode 3 and the negative electrode 2 to form a battery structure. The battery structure 7 is stacked in a bi-cell structure, and then accommodated in the battery case 5. An electrode tab 8 acting as an electrical path for inducing the current formed in the battery structure 7 to the outside may be included. An organic electrolyte is injected into the battery case 5 and sealed to complete the manufacture of the lithium battery 1. The battery case 5 may have a rectangular shape, but is not necessarily limited to such a shape, and may have, for example, a cylindrical shape, a thin film type, or the like.

A pouch-type lithium battery corresponds to a case where a pouch is used as a battery case for each of the lithium batteries of FIGS. 12 to 14. A pouch type lithium battery may include one or more battery structures. A separator is located between a positive electrode and a negative electrode to form a cell structure. After the battery structure is stacked in a bi-cell structure, the resultant structure is wet by an organic electrolyte solution, and then, housed and sealed by a pouch, thereby completing the manufacture of a pouch-type lithium battery. For example, although not shown in the drawings, the positive electrode, the negative electrode, and the separator may be simply stacked and accommodated in the form of an electrode assembly in a pouch. In an embodiment, the positive electrode, the negative electrode, and the separator may be wound or folded into an electrode assembly in the form of a jelly roll, and then, accommodated in the pouch. Then, an organic electrolyte is injected into the pouch, which was then sealed to complete the manufacture of the lithium battery.

Lithium batteries have excellent lifespan characteristics and high rate characteristics, so they are used, for example, in electric vehicles (EVs). For example, the lithium batteries are used for hybrid vehicles such as plug-in hybrid electric vehicles (PHEVs). The lithium batteries are also used in fields requiring large amounts of power storage. For example, the lithium batteries are used for electric bicycles, power tools, etc.

A plurality of lithium batteries are stacked to form a battery module, and a plurality of battery modules may form a battery pack. Such a battery pack may be used in any device requiring high capacity and high output. For example, the battery pack may be used for laptops, smartphones, electric vehicles, etc. The battery module may include, for example, a plurality of batteries and a frame for holding the same. The battery pack may include, for example, a plurality of battery modules and a bus bar connecting the same. The battery module and/or battery pack may further include a cooling device. A plurality of battery packs may be controlled by a battery management system. The battery management system may include a battery pack and a battery control device connected to the battery pack.

The disclosure will be described in more detail through the following examples and comparative examples. However, the embodiments are provided herein for illustrative purpose only, and do not limit the scope of the present disclosure.

(Manufacture of Lithium Battery (Half Cell))

Example 1: Dry Positive Electrode, Partial Arrangement of Current Collector, Mixture Density of the First Domain>Mixture Density of the Second Domain Preparation of Positive Electrode $LiNi_{0.91}Co_{0.05}Al_{0.04}O_2$ (hereinafter referred to as NCA91) a positive electrode active material, a carbon conductive material (Denka Black), and polytetrafluoroethylene (PTFE), in a weight ratio of 92:4:4, were put into a blade mixer, and then, primary dry mixing was performed at the temperature of 25° C. at a speed of 1000 rpm for 10 minutes to prepare a first mixture, in which the active material, the conductive material, and the binder were uniformly mixed, was prepared.

Then, in order to allow the fiberization of the binder to proceed, the first mixture was additionally secondarily mixed at a rate of 5000 rpm at 25° C. for 20 minutes to prepare a second mixture. A separate solvent was not used in the preparation of the first mixture and the second mixture.

The prepared second mixture was put into an extruder and extruded to prepare a self-standing film of a positive electrode active material layer in the form of a sheet. The pressure at the time of extrusion was 50 MPa.

A positive electrode current collector in which a carbon layer was disposed as a coating layer on opposite surfaces of an aluminum thin film having a thickness of 12 μm was prepared.

The carbon layer was prepared by coating a composition including a carbon conductive material (Danka black) and polyvinylidene fluoride (PVDF) on an aluminum thin film and then drying the same. The thickness of the carbon layer disposed on one surface of the aluminum thin film was about 1 μm.

The positive active material layer self-standing film is disposed on each of the opposite surfaces of the positive electrode current collector to prepare a first stack structure having the positive active material layer self-standing film/carbon layer/aluminum/carbon layer/positive active material layer self-standing film structure.

The width of the positive electrode current collector was the same as that of the positive active material layer self-standing film, and the length of the positive electrode current collector was ¼ of the length of the positive active material layer self-standing film in a second stack below.

A first positive active material layer self-standing film was disposed, a first stack structure is disposed on a portion of the first positive active material layer self-standing film, and a second positive active material layer self-standing film is disposed on the first positive active material layer self-standing film having a potion on which the first stack structure is disposed, thereby preparing a second stack structure.

The prepared second laminate was pressed to manufacture a dry positive electrode having a uniform thickness. The pressure when pressed was 3.0 ton/cm.

The prepared dry positive electrode had a cross-sectional structure illustrated in FIG. 2B. The prepared dry positive electrode had a structure consisting of a first domain D1 in which the positive electrode current collector was disposed between opposite surfaces of the positive active material layer and a second domain D2 in which the positive electrode current collector of the positive active material layer was not disposed between opposite surfaces of the positive active material layer. Since a positive electrode current collector was additionally included between opposite surfaces of the positive active material layer self-standing film in the first domain, the mixture density of the positive active material layer included in the first domain was greater than the mixture density of the positive active material layer included in the second domain where the positive electrode current collector is not disposed.

The mixture density of the positive active material layer included in the first domain was 3.4 g/cm$^3$, and the mixture density of the positive active material layer included in the second domain was 3.0 g/cm$^3$.

The density of the mixture of the active material layer included in the first domain was calculated from the volume and weight of the cut specimen after punching and cutting the active material layer included in the first domain to certain sizes.

The mixture density of the active material layer included in the second domain was calculated such that the volume and weight of the cut specimen after punching and cutting the active material layer included in the second domain to certain sizes were calculated, and then, the volume and weight of the current collector were subtracted therefrom.

The porosity of the positive active material layer included in the first domain was 16%, and the porosity of the positive active material layer included in the second domain was 35%.

The porosity was calculated from the difference between the volume obtained from the theoretical densities of the components of the positive active material layer and the actually measured volume of the active material layer specimen.

The thickness of the positive electrode was 200 μm. That is, the thickness T2 of the positive active material layer included in the second domain D2 was 200 μm, and the total thickness T1 of the positive active material layer included in the first domain D1 and the positive electrode current collector was 200 μm.

The thickness of the positive electrode was measured using a scanning electron microscope, with respect to the side of the positive electrode.

(Manufacture of Coin Cells)

A coin cell was manufactured using the positive electrode prepared above, lithium metal as a counter electrode, PTFE separator and 1.3M $LiPF_6$EC (ethylene carbonate)+EMC (ethyl methyl carbonate)+DMC (dimethyl carbonate) (3:4:3 volume ratio) as an electrolyte.

Example 2: Dry Positive Electrode, Partial Arrangement of Current Collector, Mixture Density of the First Domain>Mixture Density of the Second Domain

Preparation of Positive Electrode

A positive electrode was prepared in the same manner as used in Example 1, except that the mixture density of the positive active material layer included in the first domain was increased compared to Example 1 by increasing the thickness of the positive active material layer self-standing film included in the first stack structure.

The mixture density of the positive active material layer included in the first domain was 3.5 g/cm$^3$, and the mixture density of the positive active material layer included in the second domain was 3.0 g/cm$^3$.

Manufacture of Coin Cells

A coin cell was manufactured in the same manner as in Example 1, except that the positive electrode prepared above was used.

Example 3: Dry Positive Electrode, Partial Arrangement of Current Collector, Mixture Density of the First Domain>Mixture Density of the Second Domain

Preparation of Positive Electrode

A positive electrode was prepared in the same manner as used in Example 1, except that the mixture density of the positive active material layer included in the first domain was increased compared to Example 1 by increasing the thickness of the positive active material layer self-standing film included in the first stack structure.

The mixture density of the positive active material layer included in the first domain was 3.6 g/$cm^3$, and the mixture density of the positive active material layer included in the second domain was 3.0 g/$cm^3$.

Manufacture of Coin Cells

A coin cell was manufactured in the same manner as in Example 1, except that the positive electrode prepared above was used.

Example 4: Dry Positive Electrode, Partial Arrangement of Current Collector, Thickness of the First Domain>Thickness of the Second Domain Preparation of Positive Electrode A dry electrode was prepared in the same method as in Example 1, except that thicknesses of the first domain and the second domain were changed differently by forming a surface step at the boundary between the first domain and the second domain by pressing with a plate having a step on the surface during the manufacture of a dry positive electrode. The prepared dry positive electrode had a structure illustrated in FIG. 3B. The thickness T1 of the first domain D1 was 200 μm, and the thickness T2 of the second domain D2 was 196 μm. The height H1 of the surface step was 2 μm based on one surface.

Manufacture of Coin Cells

A coin cell was manufactured in the same manner as in Example 1, except that the positive electrode prepared above was used.

Example 5: Dry Positive Electrode, Partial Arrangement of Current Collector, Thickness of the First Domain>Thickness of the Second Domain Preparation of Positive Electrode A dry electrode was manufactured in the same manner as in Example 4, except that the plate was pressed with an increased surface step compared to Example 4.

The prepared dry positive electrode had a structure illustrated in FIG. 3B. The thickness T1 of the first domain D1 was 200 μm, and the thickness T2 of the second domain D2 was 195 μm. The height H1 of the surface step was 2.5 μm based on one surface.

Manufacture of Coin Cells

A coin cell was manufactured in the same manner as in Example 1, except that the positive electrode prepared above was used.

Example 6: Dry Positive Electrode, Partial Arrangement of Current Collector Thickness of the First Domain>Thickness of the Second Domain Preparation of Positive Electrode A dry electrode was manufactured in the same manner as in Example 4, except that the plate was pressed with an increased surface step compared to Example 4.

The prepared dry positive electrode had a structure illustrated in FIG. 3B. The thickness T1 of the first domain D1 was 200 μm, and the thickness T2 of the second domain D2 was 194 μm. The height H1 of the surface step was 3 μm based on one surface.

Manufacture of Coin Cells

A coin cell was manufactured in the same manner as in Example 1, except that the positive electrode prepared above was used.

Comparative Example 1: Dry Positive Electrode, Partial Arrangement of Current Collector, Mixture Density of the First Domain<Mixture Density of the Second Domain Preparation of Positive Electrode A dry positive electrode was prepared in the same manner as in Example 1, except that a stack structure was prepared such that a first positive active material layer self-standing film was disposed, a positive electrode current collector was disposed on a portion of the first positive active material layer self-standing film, and a second positive active material layer self-standing film is disposed on the remaining portion thereof, and a third positive active material layer self-standing film was disposed on the positive electrode current collector and the second positive active material layer self-standing film.

The third positive active material layer self-standing film had the same size as the first positive active material layer self-standing film. The second positive active material layer self-standing film was pre-cut to occupy the surface of the first positive active material layer from which the area of the electrode current collector was excluded.

The first and third positive active material layer self-standing films and the second positive active material layer self-standing films had the same thickness and composition, etc., except for the area.

Regarding the stack structure, the first domain has a first positive active material layer self-standing film/positive electrode current collector/third positive active material layer self-standing film structure, and the second domain has a first positive active material layer self-standing film/second positive active material layer self-standing film/third positive active material layer self-standing film structure.

Since the second domain additionally included a second positive active material layer self-standing film, the mixture density of the positive active material layer included in the second domain obtained after pressing was higher than that of the positive active material layer included in the first domain.

The thickness of the second positive active material layer self-standing film was adjusted such that the mixture density of the positive active material layer included in the second domain was higher than that of the positive active material layer included in the first domain.

The prepared dry electrode had a cross-sectional structure illustrated in FIG. 1B.

The mixture density of the positive active material layer included in the first domain was 3.0 g/$cm^3$, and the mixture density of the positive active material layer included in the second domain was 3.6 g/$cm^3$.

Manufacture of Coin Cells

A coin cell was manufactured in the same manner as in Example 1, except that the positive electrode prepared above was used.

Comparative Example 2: Dry Positive Electrode, Partial Arrangement of Current Collector, First Domain Mixture Density=Second Domain Mixture Density Preparation of Positive Electrode A dry positive electrode was prepared in the same manner as in Comparative Example 1.

The thickness of the second positive active material layer self-standing film was adjusted such that the mixture density of the positive active material layer included in the second domain was equal to that of the positive active material layer included in the first domain.

The prepared dry electrode had a cross-sectional structure illustrated in FIG. 1B.

The mixture density of the positive active material layer included in the second domain obtained after pressing was 100% of the mixture density of the positive active material layer included in the first domain.

Manufacture of Coin Cells

A coin cell was manufactured in the same manner as in Example 1, except that the positive electrode prepared above was used.

Comparative Example 3: Dry Positive Electrode, Full Arrangement of Current Collectors Preparation of Positive Electrode A dry positive electrode was prepared in the same manner as in Example 1, except that a stack structure was prepared such that a positive electrode current collector was disposed on the first positive active material layer self-standing film, and the second positive active material layer self-standing film was disposed on the positive electrode current collector. The prepared dry electrode had a cross-sectional structure illustrated in FIG. 4B.

Manufacture of Coin Cells

A coin cell was manufactured in the same manner as in Example 1, except that the positive electrode prepared above was used.

Comparative Example 4: Wet Positive Electrode, Partial Arrangement of Current Collector, First Domain Mixture Density=Second Domain Mixture Density Preparation of Positive Electrode A mixture, in which $LiNi_{0.91}Co_{0.05}Al_{0.04}O_2$ positive active material, carbon conductive material (Denka Black), and polyvinylidene fluoride(PVdF) were mixed in a weight ratio of 92:4:4, was mixed with N-methylpyrrolidone (NMP) in an agate mortar to prepare slurry.

The slurry was bar-coated on a substrate, dried at room temperature, and then dried again under vacuum and 120° C. to prepare a first positive electrode active material layer.

An aluminum current collector having a thickness of 15 μm was placed on a portion of the first positive electrode active material layer, and the slurry was bar-coated on the remaining portion of the first positive electrode active material layer and the first positive electrode active material layer on which the aluminum current collector was disposed. The resultant structure was dried at room temperature, and then dried in vacuum condition at a temperature of 120° C. to introduce a second positive active material layer, thereby obtaining a stack structure. The prepared laminate was pressed to prepare a positive electrode. The pressure during pressing was 4.0 ton/cm.

To make the mixture density of the positive active material layer included in the second domain to be the same as the mixture density of the positive active material layer included in the first domain, the slurry was additionally coated on the remaining part of the first positive electrode active material layer to adjust the thickness of the second positive active material layer disposed only on the remaining part of the first positive electrode active material layer.

The mixture density of the positive active material layer included in the second domain obtained after pressing was 100% of the mixture density of the positive active material layer included in the first domain.

The prepared negative electrode had a cross-sectional structure illustrated in FIG. 1B.

Manufacture of Coin Cells

A coin cell was manufactured in the same manner as in Example 1, except that the positive electrode prepared above was used.

Comparative Example 5: Wet Positive Electrode, Full Arrangement of Current Collectors Preparation of Positive Electrode A mixture, in which $LiNi_{0.91}$ $Co_{0.05}Al_{0.04}O_2$ positive active material, carbon conductive material (Denka Black), and polyvinylidene fluoride(PVdF) were mixed in a weight ratio of 92:4:4, was mixed with N-methylpyrrolidone (NMP) in an agate mortar to prepare slurry.

The slurry was bar-coated on one side of an aluminum current collector having a thickness of 15 μm, dried at room temperature, and dried again under vacuum and 120° C. to introduce a first cathode active material layer.

Subsequently, a second positive electrode active material layer was introduced onto another surface of the aluminum current collector in the same manner to prepare a stack structure. The prepared laminate was pressed to prepare a positive electrode. The pressure during pressing was 4.0 ton/cm.

The prepared positive electrode had a cross-sectional structure illustrated in FIG. 4B.

Manufacture of Coin Cells

A coin cell was manufactured in the same manner as in Example 1, except that the positive electrode prepared above was used.

Reference Example 1: Dry Positive Electrode, Free of Coating Layer

A dry positive electrode was manufactured in the same manner as in Example 1, except that an aluminum thin film with a thickness of 10 μm, which was not coated with a carbon layer, was used as a positive electrode current collector.

Since a part of the positive electrode active material layer was peeled off from the positive electrode current collector in the manufactured positive electrode, it was impossible to manufacture a coin cell.

Evaluation Example 1: Evaluation of Vertical Force of Positive Electrode Active Material Layer (I)

The binding characteristics of the cathode active material layer included in the cathodes prepared in Examples 1 to 6 and Comparative Examples 1 to 5 were analyzed using SAICAS (SAICAS EN-EX, Daipla Wintes, JAPAN).

Binding characteristics were analyzed for the first domain where the positive electrode current collector was placed between opposite surfaces of the positive active material layer.

The vertical force ($F_V$) according to the depth was measured by performing a constant velocity analysis using a diamond blade having the width of 1 mm at the clearance angle of 10°, at the rake angle of 20°, at the shear angle of 45°, at the horizontal velocity of 4 μm/s, and at the vertical velocity of 0.4 μm/s.

First, a first constant velocity analysis was performed from a first position on the surface of the positive electrode active material layer to the surface of the positive electrode current collector, which are included in the first domain, and the blade was horizontally moved along the surface of the positive electrode current collector to remove the positive electrode active material layer. Then, at a position 10 μm backward from the first position, a second constant velocity analysis was performed under the same conditions as the first constant velocity analysis. The data measured from the second constant velocity analysis were used.

With respect to the positive electrode active material layer, the vertical force of the positive electrode active material layer was measured, and the measured data was normalized by the binding force graph area to derive the vertical relative force ($F_{VR}$) according to the depth of the positive electrode active material layer.

For the vertical force of the positive electrode active material layer, data measured in the section from a first point spaced 5% from the surface of the positive electrode active material layer to a second point spaced 5% from the surface of the electrode current collector with respect to the total thickness of the positive electrode active material layer, was used. That is, data near the surface of the positive electrode active material layer and data near the surface of the electrode current collector were excluded to prevent measurement errors.

From the derived vertical relative force ($F_{VR}$) data of the positive electrode active material layer, a change rate of vertical relative force ($F_{VR}$) was calculated using Equation 1 below. In addition, the arithmetic mean value was calculated from the derived vertical relative force ($F_{VR}$) data of the positive electrode active material layer. Some of the results are shown in Table 1 below.

$$\text{Rate of change in vertical relative force } (F_{VR}) = [(\text{maximum value of vertical relative force} - \text{minimum value of vertical relative force})/\text{minimum value of vertical relative force}] \times 100 \quad \text{Equation 1}$$

TABLE 1

| | Vertical relative force change rate [%] |
|---|---|
| Comparative Example 5 | 1718 |
| Example 1 | 180 |

As shown in Table 1, the ratio of change of the vertical relative force of the positive electrode active material layer included in the positive electrode of Example 1 was 300% or less.

Therefore, it was confirmed that the positive electrode active material layer had a uniform binding force and composition distribution regardless of the position along the thickness direction.

In contrast, in the positive electrode active material layer included in the positive electrode of Comparative Example 5, the change rate of the binding force in the vertical direction exceeded 300%.

Therefore, it was confirmed that the cathode active material layer had a significantly changed binding force and composition distribution depending on the thickness direction.

Evaluation Example 2: Evaluation of the Horizontal Force of the Positive Electrode Active Material Layer (II)

The binding characteristics of the positive electrode active material layer included in the positive electrodes prepared in Examples 1 to 6 and Comparative Examples 1 to 5 were analyzed using SAICAS (SAICAS EN-EX, Daipla Wintes, JAPAN).

Binding characteristics were analyzed for the first domain where the positive electrode current collector was placed between opposite surfaces of the positive active material layer.

The horizontal force ($F_H$) according to the depth was measured by performing a constant velocity analysis using a diamond blade having the width of 1 mm at the clearance angle of 10°, at the rake angle of 20°, at the shear angle of 45°, at the horizontal velocity of 4 μm/s, and at the vertical velocity of 0.4 μm/s.

First, a first constant velocity analysis was performed from a first position on the surface of the positive electrode active material layer to the surface of the positive electrode current collector, which are included in the first domain, and the blade was horizontally moved along the surface of the positive electrode current collector to remove the positive electrode active material layer. Then, at a position 10 μm backward from the first position, a second constant velocity analysis was performed under the same conditions as the first constant velocity analysis. The data measured from the second constant velocity analysis were used.

With respect to the total thickness of the positive electrode active material layer, the first horizontal force ($F_{H1}$) at the first point 10% apart from the surface of the positive electrode active material layer and the second horizontal force ($F_{H2}$) at the second point 10% apart from the surface of the positive electrode current collector were measured.

Some of the results of horizontal force binding force evaluation are shown in Table 2 below. The horizontal force ratio of the first point and the second point is defined by Equation 2.

$$\text{Horizontal force ratio of the first point and the second point (\%)} = [F_{H2}/F_{H1}] \times 100 \quad \text{< Equation 2 >}$$

TABLE 2

| | Horizontal relative force binding ratio [%] |
|---|---|
| Comparative Example 5 | 45 |
| Example 1 | 75 |

As shown in Table 2, the horizontal force ratio of the positive active material layer of Example 1 was greater than that of the positive active material layer of Comparative Example 5.

Therefore, it was confirmed that the positive electrode active material layer of Example 1 had a more uniform binding force and composition distribution compared to the positive electrode active material layer of Comparative Example 5.

Evaluation Example 3: Evaluation of Charge and Discharge Characteristics at Room Temperature Each of the lithium batteries manufactured in Examples 1 to 6 and Comparative Examples 1 to 5 was charged with a constant current of 0.1 C rate at 25° C. until a voltage reached 4.4 V (vs. Li), and was then cut-off at a current of 0.05 C rate while maintaining the voltage at 4.4 V in a constant voltage mode. Subsequently, the lithium battery was discharged at a constant current of 0.1 C rate until the voltage reached 2.8V (vs. Li) (formation cycle).

The lithium battery that had undergone the formation cycle, was charged with a constant current at 25° C. at a rate of 0.5 C until the voltage reached 4.4 V (vs. Li). Then, the lithium battery was discharged at a constant current of 0.5C rate until the voltage reached 2.8 V (vs. Li) during discharging, and this cycle was repeated under the same conditions up to the $100^{th}$ cycle (repeated 100 times).

In all charge/discharge cycles, a 10-minute stop time was provided after every charge/discharge cycle. Some of the results of the charging and discharging experiments at room temperature are shown in Table 3 below. The capacity retention rate in the 100th cycle is defined by Equation 1 below.

$$\text{Capacity retention ratio [\%]} = [\text{discharge capacity in } 100^{th} \text{ cycle/discharge capacity in } 1^{st} \text{ cycle}] \times 100 \quad \text{Equation 1}$$

TABLE 3

| | Capacity retention ratio [%] |
|---|---|
| Example 1 | 92 |
| Example 2 | 91 |
| Example 3 | 90 |
| Example 4 | 89 |
| Example 5 | 89.5 |
| Example 6 | 90 |
| Comparative Example 1 | 87 |
| Comparative Example 2 | 86 |
| Comparative Example 3 | 83 |
| Comparative Example 4 | 85 |
| Comparative Example 5 | 80 |

As shown in Table 3, the lithium batteries of Examples 1 to 6 had improved room-temperature lifespan characteristics compared to the lithium batteries of Comparative Examples 1 to 5.

Evaluation Example 4: Room Temperature High Rate Characteristic Evaluation

Each of the lithium batteries manufactured in Examples 1 to 6 and Comparative Examples 1 to 5 was charged with a constant current of 0.1 C rate at 25° C. until a voltage reached 4.4 V (vs. Li), and was then cut-off at a current of 0.05 C rate while maintaining the voltage at 4.4 V in a constant voltage mode. Subsequently, the lithium battery was discharged at a constant current of 0.1 C rate until the voltage reached 2.8 V (vs. Li) (formation cycle).

The lithium battery that had undergone the formation cycle, was charged with a constant current at 25° C. at a rate of 0.2 C until the voltage reached 4.4 V (vs. Li). Subsequently, the lithium battery was discharged at a constant current at a rate of 0.2 C until the voltage reached 2.8 V (vs. Li) ($1^{st}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current of 0.33 C rate until the voltage reached 2.8 V (vs. Li) ($2^{nd}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current of 0.5 C rate until the voltage reached 2.8 V (vs. Li) ($3^{rd}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current at a rate of 1.0 C until the voltage reached 2.8 V (vs. Li) ($4^{th}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current at a rate of 2.0 C until the voltage reached 2.8 V (vs. Li) ($5^{th}$ cycle).

The lithium battery that had undergone the formation cycle, was charged with a constant current at 25° C. at a rate of 0.2 C until the voltage reached 4.4 V (vs. Li). Subsequently, the lithium battery was discharged at a constant current of 3.0 C rate until the voltage reached 2.8 V (vs. Li) ($6^{th}$ cycle).

In all charge/discharge cycles, a 10-minute stop time was provided after every charge/discharge cycle. Some of the results of the charging and discharging experiments at room temperature are illustrated in FIG. 2 and Table 2. The high rate characteristics are defined by Equation 2 below.

$$\text{High-rate characteristic } [\%] = [\text{discharge capacity in } 5^{th} \text{ cycle/discharge capacity in } 1^{st} \text{ cycle}] \times 100 \quad \text{< Equation 2 >}$$

TABLE 4

| | High-rate characteristic (2 C/0.2 C) [%] |
|---|---|
| Example 1 | 75 |
| Example 2 | 74 |
| Example 3 | 73 |
| Example 4 | 72 |
| Example 5 | 72.5 |
| Example 6 | 73 |
| Comparative Example 1 | 58 |
| Comparative Example 2 | 60 |
| Comparative Example 3 | 58 |
| Comparative Example 4 | 60 |
| Comparative Example 5 | 52 |

As shown in Table 4, the lithium batteries of Examples 1 to 6 had improved high-rate characteristics compared to the lithium batteries of Comparative Examples 1 to 5.

The invention claimed is:

1. An electrode comprising:

an electrode active material layer including an electrode active material and a binder;

an electrode current collector disposed on a portion of one surface of the electrode active material layer or in a portion between opposite surfaces of the electrode active material layer;

a first domain including the electrode active material layer and the electrode current collector disposed on one surface or between opposite surfaces of the electrode active material layer; and a second domain including the electrode active material layer, the electrode active material layer being free of the electrode current collector on one surface or between opposite surfaces thereof, wherein a mixture density of the electrode active material layer included in the second domain is less than 99% of a mixture density of the electrode active material layer included in the first domain, a thickness of the electrode active material layer included in the second domain is 99% or less of a total thickness of the electrode active material layer and the electrode current collector which are included in the first domain, a surface step of the electrode active material layer is disposed at a boundary between the first domain and the second domain, and a height of the surface step of the electrode active material layer is 1% or more of a total thickness of the electrode active material layer and the electrode current collector in the first domain.

2. The electrode of claim 1, wherein a difference between the mixture density of the electrode active material layer included in the first domain and the mixture density of the electrode active material layer included in the second domain is 0.1 g/cm$^3$ to 2.0 g/cm$^3$.

3. The electrode of claim 1, wherein a porosity of the electrode active material layer included in the first domain is 99% or less of a porosity of the electrode active material layer included in the second domain.

4. The electrode of claim 1, wherein the binder is a dry binder, the dry binder includes a fibrillized binder, and the dry binder includes a fluorine-based binder.

5. The electrode of claim 1, wherein the electrode active material layer further comprises a conductive material, the conductive material is a dry conductive material, and the dry conductive material comprises a carbon-based conductive material.

6. The electrode of claim 1, wherein the electrode active material layer is a self-standing film, and the electrode active material layer is free of a residual processing solvent.

7. The electrode of claim 1, wherein the electrode current collector further includes a coating layer disposed on one surface or opposite surfaces of the electrode current collector, and a thickness of the coating layer is 30% or less of a thickness of the electrode current collector.

8. The electrode of claim 7, wherein the coating layer includes a binder, the binder includes at least one selected from a conductive binder and a non-conductive binder, and the binder includes a fluorine-based binder.

9. The electrode of claim 8, wherein the coating layer further comprises a carbon-based conductive material.

10. The electrode of claim 1, wherein, in the first domain, when the electrode active material layer is measured using a surface and interfacial measuring analysis system (SAICAS), with respect to the entire thickness of the electrode active material layer, a ratio of change in a vertical relative force ($F_{VR}$) according to a depth from a first point spaced 5% from a surface of the electrode active material layer in a direction from the surface of the electrode active material layer to the electrode current collector, to a second point spaced 5% apart from a surface of the electrode current collector in a direction from the surface of the electrode current collector to the surface of the electrode active material layer, is 300% or less.

11. The electrode of claim 1, wherein, in the first domain, when the electrode active material layer is measured using a surface and interfacial measuring analysis system (SAICAS), with respect to the entire thickness of the electrode active material layer, a horizontal force ratio of a second horizontal force ($F_{H2}$) at a second point spaced 10% apart from a surface of the electrode current collector in a direction from the surface of the electrode current collector to a surface of the electrode active material layer, to a first horizontal force ($F_{H1}$) at a first point spaced 10% from the surface of the electrode active material layer in a direction from the surface of the electrode active material layer to the electrode current collector, is 50% or more.

12. The electrode of claim 1, wherein the electrode active material layer comprises:

a first surface, and a second surface opposing the first surface;

a first side surface connected to longitudinal ends of the first surface and the second surface, and a second side surface opposing the first side surface; and a third side surface connected to width direction ends of the first surface and the second surface, and a fourth side surface opposing the third side surface, wherein the first domain is defined by the first surface, the second surface, the third side surface, and the fourth side surface, and is a region including the electrode current collector disposed between the first surface and the second surface, and the second domain is defined by the first surface, the second surface, the third side surface, and the fourth side surface, and is a region in which the electrode current collector is absent, between the first surface and the second surface.

13. The electrode of claim 12, wherein the electrode active material layer has a first area defined by a first distance in a longitudinal direction of the electrode active material layer and a first distance in a width direction of the electrode active material layer, the electrode current collector has a second area defined by a second distance in a longitudinal direction of the electrode current collector and a second distance in a width direction of the electrode current collector, and the second area of the electrode current collector is 90% or less of the first area of the electrode active material layer.

14. The electrode of claim 12, wherein the second distance in the longitudinal direction of the electrode current collector is 90% or less of the first distance in the longitudinal direction of the electrode active material layer, or the second distance in the width direction of the electrode current collector is 90% or less of the first distance in the width direction of the electrode active material layer, or the second distance in the longitudinal direction of the electrode current collector is 90% or less of the first distance in the longitudinal direction of the electrode active material layer, and the second distance in the width direction of the electrode current collector is 90% or less of the first distance in the width direction of the electrode active material layer.

15. The electrode of claim 12, wherein the electrode current collector is exposed on three or less side surfaces selected from the first side surface, the second side surface, the third side surface, and the fourth side surface of the electrode active material layer, and the electrode current collector further comprises a tap extending to the outside of the electrode active material layer through two or less side surfaces selected from the first side surface, the second side surface, the third side surface and the fourth side surface of the electrode active material layer.

16. The electrode of claim 12, further comprising a plurality of electrode current collectors spaced apart from each other along a longitudinal direction or width direction of the electrode active material layer, and the plurality of electrode current collectors are arranged so as to form an angle of 45 degrees or less with at least one of the first surface and the second surface of the electrode active material layer.

17. A lithium battery comprising:

a positive electrode;

a negative electrode; and an electrolyte disposed between the positive electrode and the negative electrode, wherein at least one of the positive electrode and the negative electrode is the electrode of claim 1.

18. A method of manufacturing an electrode, the method comprising:

preparing a mixture by dry-mixing an electrode active material, a dry conductive material, and a dry binder;

providing an electrode current collector; and disposing and pressing the mixture on one surface or opposite surfaces of the electrode current collector to manufacture an electrode including an electrode active material layer on one surface or opposite surfaces of the electrode current collector, wherein the electrode includes: a first domain including the electrode active material layer and the electrode current collector disposed on one surface or between opposite surfaces of the electrode active material layer; and a second domain including the electrode active material layer, the electrode active material layer being free of the electrode current collector on one surface or between opposite surfaces thereof, and a mixture density of the electrode active material layer included in the second domain is less than 99% of a mixture density of the electrode active material layer included in the first domain, wherein the electrode active material layer comprises:

a first surface, and a second surface opposing the first surface;

a first side surface connected to longitudinal ends of the first surface and the second surface, and a second side surface opposing the first side surface; and a third side surface connected to width direction ends of the first surface and the second surface, and a fourth side surface opposing the third side surface, and wherein the first domain is defined by the first surface, the second surface, the third side surface, and the fourth side surface, and is a region including the electrode current collector disposed between the first surface and the second surface, and the second domain is defined by the first surface, the second surface, the third side surface, and the fourth side surface, and is a region in which the electrode current collector is absent, between the first surface and the second surface.

19. The method of claim 18, wherein a total thickness of the electrode active material layer included in the second domain is 99% or less of a total thickness of the electrode active material layer and the electrode current collector which are included in the first domain.

20. An electrode comprising:

an electrode active material layer including an electrode active material and a binder;

an electrode current collector disposed on a portion of one surface of the electrode active material layer or in a portion between opposite surfaces of the electrode active material layer;

a first domain including the electrode active material layer and the electrode current collector disposed on one surface or between opposite surfaces of the electrode active material layer; and a second domain including the electrode active material layer, the electrode active material layer being free of the electrode current collector on one surface or between opposite surfaces thereof, wherein a mixture density of the electrode active material layer included in the second domain is less than 99% of a mixture density of the electrode active material layer included in the first domain, wherein the electrode active material layer comprises:

a first surface, and a second surface opposing the first surface;

a first side surface connected to longitudinal ends of the first surface and the second surface, and a second side surface opposing the first side surface; and a third side surface connected to width direction ends of the first surface and the second surface, and a fourth side surface opposing the third side surface, and wherein the first domain is defined by the first surface, the second surface, the third side surface, and the fourth side surface, and is a region including the electrode current collector disposed between the first surface and the second surface, and the second domain is defined by the first surface, the second surface, the third side surface, and the fourth side surface, and is a region in which the electrode current collector is absent, between the first surface and the second surface.

* * * * *